(12) United States Patent
Mizan et al.

(10) Patent No.: US 12,135,698 B2
(45) Date of Patent: Nov. 5, 2024

(54) DISTRIBUTED DEDUPLICATION OF INCOMING CLOUD COMPUTING REQUESTS

(71) Applicant: Microsoft Technology Licensing, LLC, Redmond, WA (US)

(72) Inventors: Md Mainul Mizan, Kirkland, WA (US); Kamil Krzywicki, Sammamish, WA (US); Anshul Dube, Redmond, WA (US); Brian Alan Day, Lakeville, MA (US); Robert Allen Lowe, Redmond, WA (US); Shankaranand Arunachalam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 17/201,866

(22) Filed: Mar. 15, 2021

(65) Prior Publication Data
US 2022/0292065 A1 Sep. 15, 2022

(51) Int. Cl.
*G06F 16/215* (2019.01)
*G06F 16/242* (2019.01)
(Continued)

(52) U.S. Cl.
CPC ........ *G06F 16/215* (2019.01); *G06F 16/2433* (2019.01); *G06F 16/24573* (2019.01); *G06F 16/248* (2019.01); *G06F 16/284* (2019.01)

(58) Field of Classification Search
None
See application file for complete search history.

(56) References Cited

U.S. PATENT DOCUMENTS

| | | | | |
|---|---|---|---|---|
| 5,835,765 A | * | 11/1998 | Matsumoto | G06F 9/4843 718/107 |
| 6,591,380 B1 | * | 7/2003 | Nagaura | H04L 1/0061 714/48 |

(Continued)

FOREIGN PATENT DOCUMENTS

EP 3664384 A1 6/2020

OTHER PUBLICATIONS

"Non Final Office Action Issued in U.S. Appl. No. 17/201,927", Mailed Date: Dec. 22, 2022, 40 Pages.
(Continued)

*Primary Examiner* — Yu Zhao
(74) *Attorney, Agent, or Firm* — RAY QUINNEY & NEBEKER P.C.; Paul N. Taylor

(57) ABSTRACT

Examples of the present disclosure describe systems and methods for migrating mailbox identities. In aspects, a system may receive one or more requests to perform tasks for migrating identities of a plurality of mailboxes included in a security group created at a source tenant to a plurality of mail users created at a target tenant that correspond to the plurality of mailboxes. Based on the one or more requests, the system may copy the identities to a data store associated with the target tenant, upload mapping data to the data store, and use that mapping data to map the identities copied to the data store to the corresponding plurality of mail users in the target tenant. For each of the identities mapped, the system may copy at least one or more attributes of the respective identity from the data store to the respective corresponding mail user in the target tenant.

20 Claims, 9 Drawing Sheets

(51) Int. Cl.
  *G06F 16/2457* (2019.01)
  *G06F 16/248* (2019.01)
  *G06F 16/28* (2019.01)

(56) References Cited

U.S. PATENT DOCUMENTS

| | | | |
|---|---|---|---|
| 8,886,716 B2 | 11/2014 | Tofano | |
| 9,164,687 B1 | 10/2015 | Bhatt et al. | |
| 9,171,008 B2 | 10/2015 | Prahlad et al. | |
| 10,742,732 B1 | 8/2020 | Lindeman et al. | |
| 11,487,708 B1* | 11/2022 | Dangi | G06F 16/156 |
| 2002/0065892 A1* | 5/2002 | Malik | H04L 51/08 |
| | | | 707/999.01 |
| 2006/0294058 A1* | 12/2006 | Zabback | G06F 16/2462 |
| 2010/0011033 A1 | 1/2010 | Czeczulin | |
| 2011/0029739 A1* | 2/2011 | Nakajima | G06F 3/0608 |
| | | | 711/E12.001 |
| 2011/0167221 A1 | 7/2011 | Pangal et al. | |
| 2011/0213789 A1 | 9/2011 | Doshi et al. | |
| 2011/0302277 A1 | 12/2011 | Baker | |
| 2013/0036272 A1 | 2/2013 | Nelson | |
| 2013/0212200 A1 | 8/2013 | Dennis et al. | |
| 2014/0149517 A1 | 5/2014 | Greinhofer et al. | |
| 2016/0092251 A1* | 3/2016 | Wagner | G06F 9/547 |
| | | | 718/1 |
| 2016/0188614 A1 | 6/2016 | Lindley et al. | |
| 2016/0253339 A1 | 9/2016 | Ambrose et al. | |
| 2016/0300375 A1* | 10/2016 | Beckett | G06F 16/248 |
| 2017/0116205 A1 | 4/2017 | Willis et al. | |
| 2018/0268045 A1 | 9/2018 | Orman et al. | |
| 2018/0321993 A1* | 11/2018 | McClory | H04L 41/5041 |
| 2019/0073152 A1 | 3/2019 | Nagle et al. | |
| 2019/0188288 A1 | 6/2019 | Holm et al. | |
| 2019/0207887 A1* | 7/2019 | Kasheff | H04L 51/212 |
| 2020/0125665 A1* | 4/2020 | Flores Michel | G06F 16/285 |
| 2022/0043863 A1* | 2/2022 | Garg | G06F 16/904 |
| 2022/0188160 A1* | 6/2022 | Nelson | G06F 9/5005 |
| 2022/0294849 A1 | 9/2022 | Mizan et al. | |

OTHER PUBLICATIONS

Bostick, et al., "Email Migration: Strategies and Outcome", In Proceedings of the 25th Annual ACM SIGUCCS Conference on user Srvices: are you ready, Nov. 9, 1997, pp. 29-34.

McCorry, Kieran, "Microsoft® Exchange Server 2003 Deployment and Migration", Retrieved from: https://www.sciencedirect.com/book/9781555583163/microsoft-exchange-server-2003-deployment-and-migration#book-info, Aug. 2004, pp. 211-277.

"International Search Report and Written Opinion Issued in PCT Application No. PCT/US22/018409", Mailed Date: May 25, 2022, 14 Pages.

"International Search Report and Written Opinion Issued in PCT Application No. PCT/US22/018401", Mailed Date: May 25, 2022, 13 Pages.

"Amazon Simple Queue Service", Retrieved from: https://web.archive.org/web/20201030123840/https://docs.aws.amazon.com/AWSSimpleQueueService/latest/SQSDeveloperGuide/sqs-dg.pdf, Oct. 30, 2020, 182 Pages.

"SendMessage—Amazon Simple Queue Service", Retrieved from: https://web.archive.org/web/20201028012230/https://docs.aws.amazon.com/AWSSimpleQueueService/latest/APIReference/API_SendMessage.html, Retrieved Date: Oct. 28, 2020, 7 Pages.

Lytvyn, et al., "Development of Intellectual System for Data De-Duplication and Distribution in Cloud Storage", In Journal of Webology, vol. 16, Issue 2, Dec. 2019, 42 Pages.

"Final Office Action Issued in U.S. Appl. No. 17/201,927", Mailed Date: Jun. 23, 2023, 41 Pages.

"Notice of Allowance Issued in U.S. Appl. No. 17/201,927", Mailed Date: Oct. 24, 2023, 10 Pages.

U.S. Appl. No. 17/201,927, filed Mar. 15, 2021.

"Notice of Allowance Issued in U.S. Appl. No. 17/201,927", Mailed Date: Aug. 30, 2023, 11 Pages.

Notice of Allowance mailed on Jan. 31, 2024, in U.S. Appl. No. 17/201,927, 11 pages.

* cited by examiner

DISTRIBUTED DEDUPLICATION OF INCOMING CLOUD COMPUTING REQUESTS

BACKGROUND

Typically, cloud computing system architecture includes a frontend and a backend. The frontend, also referred to as an endpoint, interfaces with clients to, among other things, receive incoming requests to perform various tasks and pass those tasks along to the backend. The backend manages associated data and is responsible for executing the tasks of the requests received via the endpoint. In some examples, these requests may include temporally and/or computationally expensive tasks to be executed.

In a multi-tenancy cloud computing system, where the clients include tenants and each tenant includes a group of users, a request may be received to migrate data from a first tenant to a second tenant. As one example, the data to be migrated may include mailboxes having associated user identities that may often contain sensitive information. Conventional techniques for identity migration may include downloading and transferring these identities using offline means from the source tenant to the target tenant (e.g., sending within an email).

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for distributed deduplication of incoming cloud computing requests. In aspects, upon receipt of an incoming request, one or more deduplication methods may be implemented across a cloud computing system architecture that includes an endpoint, a queue, a data store, and a plurality of worker roles. For example, a first deduplication method may be implemented as the request is received in message form at the endpoint, a second deduplication method may be implemented after the endpoint pushes the message to the queue, and/or a third deduplication method may be implemented after a worker role retrieves the message from the queue prior to storage of the message in the data store for later processing and task execution. Implementation of one or more of these deduplication methods (e.g., one, a combination, or all of the deduplication methods) distributed across the cloud computing system architecture aid in preventing the overload of the cloud computing system by discarding duplicate requests.

In other aspects, the cloud computing system may be a multi-tenancy cloud computing system and an example request type received may include requests to perform tasks for migrating mailbox identities between a source tenant and a target tenant. Accordingly, examples of the present disclosure further describe systems and methods for migrating mailbox identities that reduce a number of possible attack surfaces and provide a secure path for identity migration among the tenants and the system while enabling both source and target tenant administrators control over the migration. For example, following validation and acceptance of an initial synchronization request to initiate migration, identities of the mailboxes from the source tenant may be copied to a secure tenant shard of the target tenant such that the associated values of those identities may then be copied to mail users created in the target tenant to correspond to the mailboxes. The identities may be copied to the mail users once the identities and corresponding mail users are mapped to each other using uploaded mapping data. In some examples, each of these migration tasks may not be able to be performed at once, and thus a plurality of requests may be utilized (e.g., an upload request, a map request, and a write request in addition to the initial synchronization request).

In further aspects, the one or more deduplication methods may be implemented as the identity migration-related requests are received at the endpoint of the cloud computing system to prevent overload of the system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
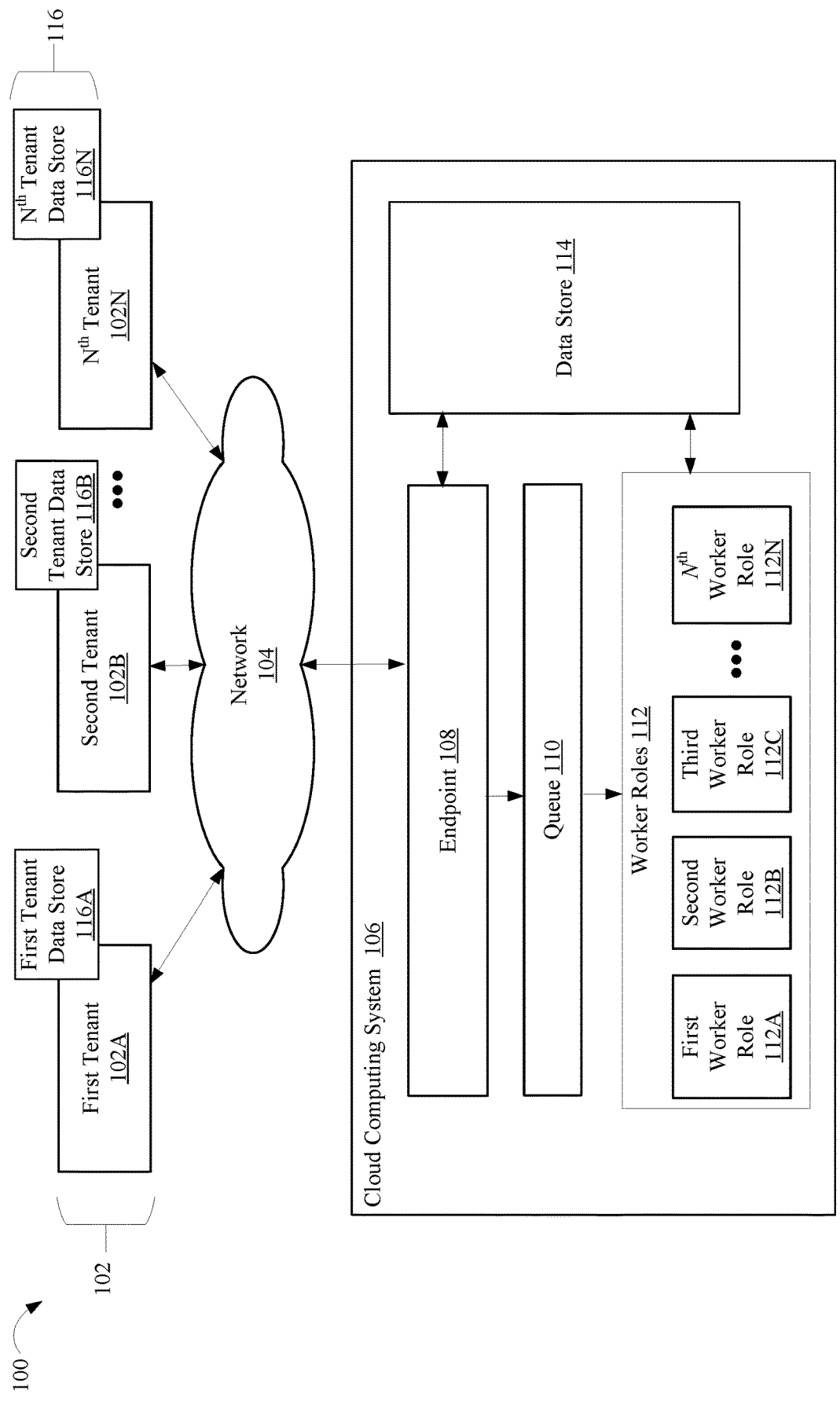
FIG. 1 illustrates an overview of an example system for distributed deduplication of incoming cloud computing requests.

As briefly discussed above, incoming requests to a cloud computing system may include time and/or computationally expensive tasks to be executed. Resultantly, the system can become quickly overloaded processing these requests, particularly if one or more of the requests are intentionally (e.g., nefariously) or unintentionally, duplicated. For example, a plurality of requests for performance of a same job may be pushed to the system in quick succession as part of a denial-of-service (DOS) or distributed denial-of-service (DDOS) attack as an attempt to overwhelm the system. Additionally or alternatively, human error may unintentionally lead to the duplication of a request. As one example, a client end user (e.g., a user having an administrator role) may grow impatient and submit a request more than one time, or a bad script may cause the request to be submitted more than once. As another example, multiple users may have administrator roles, and two or more of those administrators may submit the request unknowing that the other(s) had already done so. Even if the duplicate requests do not result in an overloading of the system, duplicate performance of the requested tasks wastes computing resources, and the duplicative results of the tasks may be undesirable.

To provide an example scenario, a request may be received at a multi-tenant cloud computing system to migrate 1,000 user identities from a source tenant to a target tenant as a result of a first entity associated with the target tenant at least partially acquiring a second entity associated with the source tenant. If this same request is then resubmitted to the system (e.g., a duplicate request is sent) then the system will have to utilize valuable memory and processing resources to store the duplicate request and execute the migration task for a second time. Additionally, the target tenant will now have 2,000 user identities with duplicates of each user identity for which further tasks will need to be performed (and thus further processing resources used) to clean up and remove the duplicates.

The present disclosure describes systems and methods for distributed deduplication of incoming cloud computing requests. In aspects, one or more deduplication methods may be implemented across the cloud computing system architecture at various stages as the message moves from an endpoint that receives and pushes the message to a queue for subsequent retrieval by a worker role that stores the message in a data store for later processing and task execution.

In some aspects, at the endpoint, a request in a form of a message may be received. Prior to pushing the received message to a queue for subsequent retrieval by a worker role, a first deduplication method may be performed to determine whether the received message is a duplicate of a message already stored in a data store. If so, the received message may be discarded to prevent message processing and re-execution of the same tasks twice, as well as unnecessary storage in the data store prior to processing. Otherwise, if the received message is not a duplicate, the received message may be placed in a queue.

Subsequent to the received message being placed in the queue, a second deduplication method may be performed that involves defining and comparing a key for the received message to keys defined for other messages in the queue to determine whether the key is a duplicate. If the key is a duplicate, then the received message may be discarded to prevent message processing and re-execution of the same tasks twice, as well as unnecessary storage in the data store prior to processing. Additionally, if implemented in conjunction with the first deduplication method described above, this second deduplication at the queue specifically protects against a duplicate request that was submitted quickly after (e.g., within seconds or milliseconds of) the initial request such that the initial request still remains in the queue and has not yet been retrieved for storage in the data store causing the duplicate request to be undetected using the first deduplication method. Otherwise, if the key is not a duplicate, the received message may be maintained in the queue for subsequent retrieval and storage in the data store.

When the received message is retrieved from the queue, a third deduplication method may be performed to determine whether the received message is a duplicate of a message already stored in the data store. If the received message is a duplicate, the received message may be discarded to prevent message processing and re-execution of the same tasks twice, as well as unnecessary storage in the data store prior to processing. Additionally, if implemented in conjunction with the first and/or second deduplication methods described above, this third deduplication specifically protects against a duplicate request that was received in between the initial request's retrieval from the queue and storing to the data store causing the duplicate request to be undetected using the first and/or the second deduplication method. Otherwise, if the received message is not a duplicate, the received message may be stored in the data store. The received message may then be retrieved or accessed from the data store for processing to determine one or more tasks for execution.

Implementation of one or more of these deduplication methods (e.g., one, a combination, or all of the deduplication methods) distributed across the cloud computing system architecture aid in preventing the overload of the cloud computing system by discarding duplicate requests. Accordingly, the present disclosure of systems and methods for distributed deduplication of incoming cloud computing requests that eliminates or at least reduces a number of duplicate requests stored, processed, and executed provides a plurality of technical benefits. For example, data processing is reduced by preventing the unnecessary processing and task execution of duplicate requests. Additionally, data storage requirements are reduced (e.g., memory is conserved) by preventing the unnecessary storage of duplicate requests. Further, security of the cloud computing system is increased by preventing intentional system overload caused by DOS or DDOS attacks. Moreover, this distributed deduplication works in addition to established means of protection against DOS or DDOS attacks such as packet quota techniques, load balancing systems, virtual Internet Protocol (IP) systems, and firewalls, among other examples.

Additionally, in some aspects, the cloud computing system may be a multi-tenancy cloud computing system that provides, among other services, an identity migration service capable of receiving and processing a plurality of requests associated with identity migration. In some examples, one or more of the above-discussed deduplication methods may be performed upon receipt of one or more of the requests, such that only non-duplicate requests are processed. Identity migration may include the copying of identities of user mailboxes at a source tenant that are to be migrated to a target tenant to corresponding mail users created at the target tenant for those mailboxes. For the group of mailboxes that are to be migrated, by initially migrating the identities of the mailboxes from the source tenant to the target tenant, the mailboxes themselves may then later be more seamlessly migrated from the source tenant to the target tenant with little to no communication delivery downtime during the migration of the mailboxes themselves.

The system may also implement a request-acceptance model that requires both a request to initiate migration from one of the source or target tenant involved in the migration and acceptance of the request by the other of the source or target tenant involved in the migration. Resultantly, tenant administrators from both the source tenant and the target tenant may be enabled control over the migration, including control over what is specifically being migrated.

Further, by implementing a system as described herein to perform the identity migration, a number of possible attack surfaces for data leakage during the identity migration is reduced. As one example, the system may utilize tenant-specific data stores (e.g., tenant shards) such that the data for the tenants remains separate from one another, which eliminates or at least highly reduces the risk of cross-contamination of data between the tenants. Resultantly, one tenant may not be able to attack another tenant by retrieving sensitive, identity data that is not meant to be shared with that tenant. As another example, the system removes the need for conventional offline means for transferring mailbox identities from a source tenant administrator to a target tenant administrator to enable the copying thereof that left the identity data vulnerable to attack. Instead, the system provides a secure path to migrate the identities such that the identity data is not capable of being exposed to any other entity besides the respective tenants involved in the migration and the system as the requests are sent to and processed by the system.

FIG. 1 illustrates an overview of an example operating environment 100 for distributed deduplication of incoming cloud computing requests. In this example, the operating environment 100 includes a cloud computing system 106, referred to hereafter as system 106, that provides cloud computing services to one or more clients, such as tenants 102, over a network 104. For example, the system 106 may provide at least one of the following types of cloud computing services: Infrastructure as a Service (IaaS), Platform as a Service (PaaS), Software as a Service (SaaS) or serverless computing services. One example cloud computing system or service is the AZURE cloud computing service from the Microsoft Corporation of Redmond, Washington. While tenants 102 are discussed herein as an example client type to which the system 106 is providing services, clients interfacing with the system 106 are not so limited and can be generally understood as any client type capable of communicating with the system 106 to request performance of various jobs or tasks.

In one example and as illustrated in FIG. 1, the system 106 may be a multi-tenant cloud computing system that provides services to a plurality of tenants 102, including a first tenant 102A, a second tenant 102B, and up to an $N^{th}$ tenant 102C over the network 104. In some aspects, and as described in more detail with reference to FIG. 5, each of the tenants 102 may be associated with an entity or a subgroup of the entity. As one example, first tenant 102A may be associated with a first entity (e.g., a first company), and second tenant 102B may be associated with a second entity (e.g., a second company). As another example, first tenant 102A may be associated with a first department or geographic region of an entity, and the second tenant 102B may be associated with a second department or geographic region of the same entity. Each of the tenants 102 may comprise a group of users, where one or more of those users may be assigned tenant administrator roles, hereafter referred to as tenant administrators. In some examples, these tenant administrators (or other users) may utilize computing devices, such as computing devices described in detail with reference to FIGS. 6, 7A, and 7B, for sending requests, to the system 106 over the network 104, for various jobs to be performed. For example, using an associated computing device, a tenant administrator may execute an application associated with the system 106 that is locally installed on the computing device or access a web application associated with the system 106 through a web browser running on the computing device. Upon receiving input from the tenant administrator, such as a job request including parameters thereof for submission, the job request may be transmitted in a form of a message via the local or web application to the system 106 over the network 104.

The system 106 may include one or more components (also referred to as services of the system 106) configured to perform various functions, such as an endpoint 108, a queue 110, a plurality of worker roles 112, and a data store 114. Each of these services may be hardware components and/or software components implemented on and/or executed by hardware components of the system 106. As one example, system 106 may comprise one or more datacenters that include multiple computing devices (e.g., servers) that operate a plurality virtual machines. A virtual machine can be an isolated software container that has an operating system and an application, similar to the device described below in FIG. 6. In some examples, each of the endpoint 108, queue 110, worker roles 112, and data store 114 may be a separate logical entity operated or executed independently of one another (e.g., executed by a separate virtual machine in a same or different datacenter). In other examples, one or more of these services may be operated or executed by a same virtual machine. In further examples, one or more of these services may be operated or executed by other components of the system 106 (e.g., by one or more servers in the distributed environment of the system 106). One of skill in the art will appreciate that the scale of systems such as system 106 may vary and may include additional or fewer components than those described in FIG. 1.

The endpoint 108 generally manages frontend aspects of the system 106. For example, the endpoint 108 serves as an interface between the system 106 and clients, such as the tenants 102 (e.g., computing devices of the tenant administrators or other users), to receive incoming requests as messages and push those messages along to the queue 110. In one example, the endpoint 108 may be a Representational State Transfer (REST) endpoint. Additionally, in some examples, the endpoint may be region specific, such that it only or primarily accepts incoming requests from tenants 102 served within that region. The incoming requests may be for jobs to be run in the system 106, where the jobs may include one or more tasks to be executed. As one non-limiting example, a type of job request received may be associated with migrating data, such as a group of user mailbox identities, from the second tenant 102B to the first tenant 102A. Other jobs or tasks may include data processing or analysis tasks, including machine-learning or other types of tasks that require substantial processing resources.

The queue 110 may be short term storage that acts as a pipeline between the endpoint 108 and the worker roles 112 for messages received at the endpoint 108 that are to be eventually processed by the worker roles 112. For example, after the endpoint 108 pushes the messages to the queue 110, the messages may be maintained at the queue 110 (e.g., may be on flight at the queue 110) for a short period of time until one of the worker roles 112 retrieves the message. Depending on the type of queue and the message volume, a message may remain in the queue for less than a few seconds or for less than a second. One example queue may be the AZURE service bus queue available from the Microsoft Corporation of Redmond, Washington.

The system may include numerous worker roles 112 for processing the messages to determine and execute tasks, including a first worker role 112A, a second worker role 112B, a third worker role 112C, and up to an $N^{th}$ worker role 112N. A worker role 112 may be an application, portion of an application, software functionality, and/or an instance of software that is configured to be run applications or perform tasks within the cloud computing system 106. Different worker roles 112 may be configured to perform different tasks and run different applications and/or a single worker role may be configured perform a multitude of different tasks and run a multitude of different tasks. A worker role 112 as used herein is not limited to the worker roles utilized in the AZURE cloud computing platform.

Upon one of the worker roles 112 retrieving the message from the queue 110, the worker role 112 may first store the message in the data store 114 such that the same or another one of the worker roles 112 is able to retrieve the message from the data store 114 when available to perform the message processing and task execution. In some aspects, when the message is retrieved for processing, a lock may be acquired for the message to ensure that only the worker role 112 that initially retrieves the message from the data store 114 is able to process and execute the task, which may prevent the task being performed by multiple worker roles 112.

The data store 114 may include a database, for example, that stores the messages retrieved by the worker roles 112 from the queue 110. The stored messages represent jobs and the tasks thereof that have previously been performed, are in the process of being performed, or will be performed in the future by one of the worker roles 112. In aspects, a status of the job associated with the message (e.g., not started, pending, or completed) may be stored in association with the messages in the data store 114. The status may be updated in the data store 114 based on information provided by the worker roles 112 throughout or following message processing and task execution. The data store 114 may include various types of storage systems and configurations, such as SQL databases and NoSQL databases (e.g., an AZURE cosmos database, a MongoDB database, etc.) among others.

In some examples, a tenant administrator or another user of one of the tenants 102 may desire to view the status (e.g., progress) of one or more requests sent to the system 106. Using their associated computing device, the tenant administrator may interface with the endpoint 108 via the local or web application to obtain the status of the one or more requests. For example, the endpoint 108 may query the data store 114 for the status stored in associated with the one or more messages corresponding to the requests. The endpoint 108 may then present the status, among other information, to the tenant administrator via a user interface or view of the local or web application. In some examples, the information may be provided in report form that details the status of the request (e.g., pending, in progress, completed), what the job or task did or will do, and any errors or failures causing the job or task to not be completed.

As previously discussed, many of these jobs or tasks requested may be temporally and/or computationally expensive. Resultantly, when one or more duplicate requests for the same job are submitted to the system 106, whether intentional or unintentional, processing resources, storage space, and time is wasted on the processing and re-execution of the same tasks. Therefore, to eliminate and prevent this waste, one or more deduplication methods may be implemented across the system 106 at various stages as the request (in message form) moves from the endpoint 108 to the queue 110, and from the queue 110 to the data store 114.

In one aspect, a first deduplication method may be implemented upon receipt of the message at the endpoint 108 to prevent a duplicate from being pushed to the queue 110 as described with reference to FIG. 2. In another aspect, while the message is at the queue 110, a second deduplication method may be implemented. The message may be discarded if determined to be a duplicate to prevent it from being retrieved from the queue 110 by a worker role 112, as described with reference to FIG. 3. In a further aspect, once a worker role 112 retrieves the message from the queue 110, a third deduplication method may be implemented prior to storing the message in the data store 114 to prevent a duplicate message from being stored in the data store 114 for later retrieval, processing, and task execution, as described with reference to FIG. 3.

Figure 5:
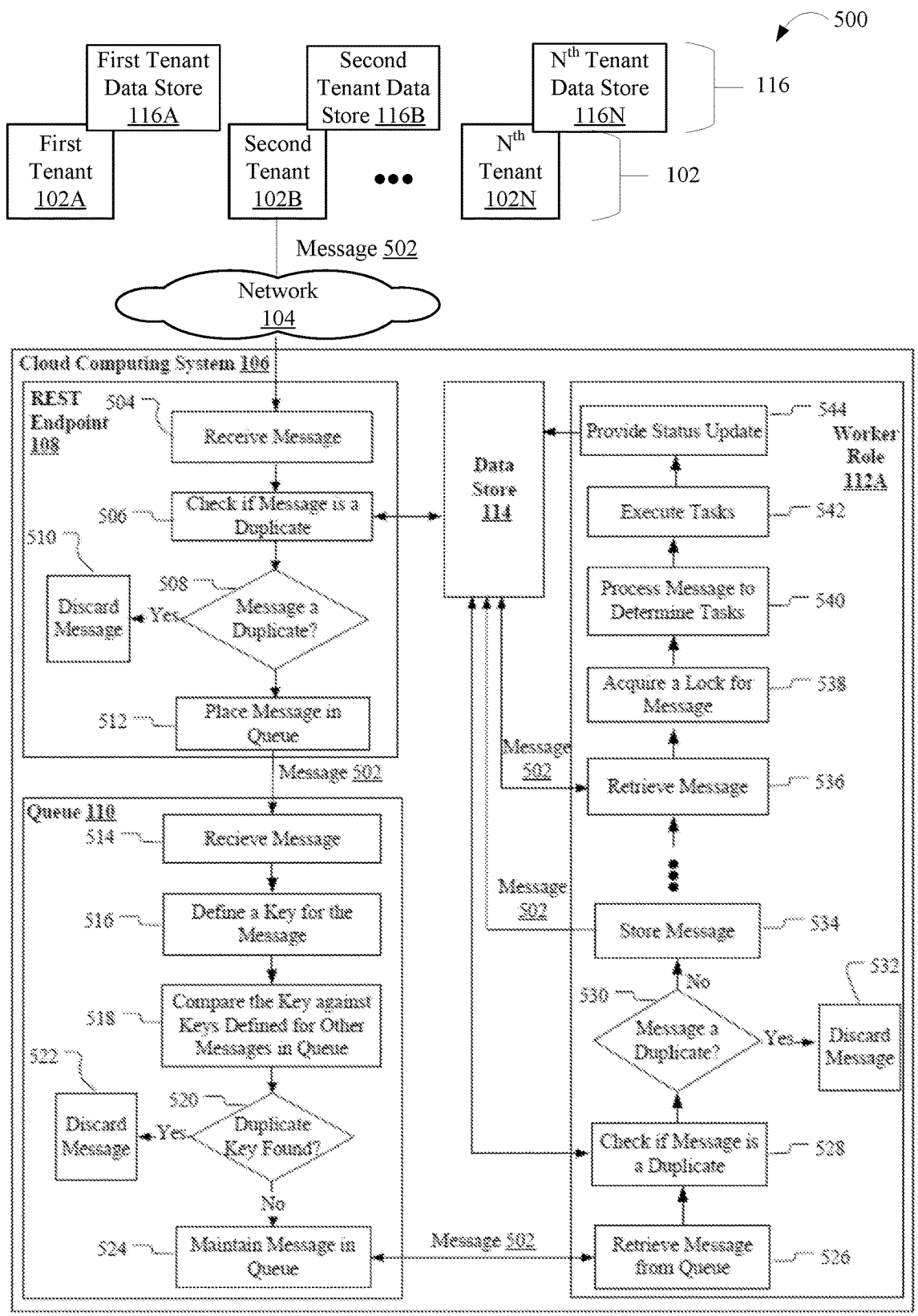
FIG. 5 illustrates an example of a system flow diagram where the first, second, and third deduplication methods are implemented for distributed deduplication of incoming cloud computing requests.

In some aspects, a combination of these three deduplication methods may be implemented together across the system 106. For example, the first and second deduplication methods may be implemented, the first and third deduplication methods may be implemented, or the second and third deduplications may be implemented. In further aspects, and as illustrated in FIG. 5, each of the three methods may be implemented in order to account for duplicate requests that, due to timing, would potentially be missed by one of the other deduplication methods. For example, the second deduplication at the queue may protect against a duplicate request that is issued quickly after the initial request (e.g., within milliseconds) such that the initial request still remains in the queue 110 and has not yet been retrieved by a worker role 112 for storage in the data store 114 causing the duplicate request to be undetected using the first deduplication method. Similarly, the third deduplication protects against a duplicate request that was received in between the initial request's retrieval from the queue 110 and storing to the data store 114 causing the duplicate request to be undetected using the first or the second deduplication method.

As previously discussed, one example request type received by the system 106 may be associated with identity migration. Identity migration may be one example service or feature of a larger service offered or provided by the system 106. As described in more detail with reference to FIGS. 5 and 6 below, identity migration may include the copying of identities of mailboxes at a source tenant (e.g., second tenant 102B) that are to be migrated to a target tenant (e.g., the first tenant 102A) to corresponding mail users created at the target tenant for those mailboxes.

The mailboxes may be associated with a communication service. In some examples, the communication service may be another service offered by the system 106. In other examples, the communication service may be provided by a separate system with which the system 106 is associated with. A mailbox may be created for each user included in the tenant, where a user has access to their respective mailbox to perform communication service related tasks (e.g., send and receive email messages, and create meetings and appointments), among other examples. The identities of the mailboxes may include a plurality of attributes, also referred to herein as identity information. Attributes of the identities represent a persona (e.g., a look and feel) of that mailbox user along with other preferences or settings for operation of the mailbox. For the group of mailboxes that are to be migrated, by initially migrating the identities thereof or at least a portion of attributes of the identities thereof, the mailboxes themselves may then later be more seamlessly migrated from the source tenant to the target tenant with little to no email delivery downtime during the migration of the mailboxes themselves.

In such examples where the tenants 102 are the types of client being serviced by the system 106 to perform identity migration between source and target tenants, the operating environment 100 may also include tenant-specific data stores 116 that are accessible by the worker roles 112. In one example and as illustrated, the tenant-specific data stores 116 may be stored locally by the tenants 102. In some aspects, the tenant-specific data stores 116 may be structured as mailboxes that are accessible to the worker roles 112 but are hidden to the tenants 102 such that the tenants 102 are unable to access the tenant-specific data stores 116. For example, the tenant-specific data stores 116 may be tenant shards that are available in the respective tenant's active directory. The tenant shards may include one or more separate collections for storing various types of data (e.g., a first collection for storing identity related data and a second collection for storing mapping data), where a collection may be comprised of one or more rows of data. In another example, the tenant-specific data stores 116 may be stored remotely from the tenants 102 by system 106. In a further example, the tenant-specific data stores 116 may be stored remotely from the tenants 102 by a separate database or storage system with which the system 106 is associated.

By utilizing the tenant-specific data stores 116, data for each of the tenants 102 remains separate from one another (e.g., there is not a common data store for the tenant data), which eliminates or at least highly reduces the risk of cross-contamination of data between the tenants 102. For example, first tenant data store 116A may store data specific to first tenant 102A, second tenant data store 116B may store data specific to second tenant 102B, and $N^{th}$ tenant data store 116N may store data specific to $N^{th}$ tenant 102N. Additionally, in some examples, to further eliminate or reduce the risk of data cross-contamination, worker roles 112 may only be able to interact with (e.g., retrieve identities from or copy identity data to) one tenant-specific data store 116 at a time when processing a request. This further helps to remove a potential attack surface for data leakage during the identity migration. For example, one tenant may no longer be able to attack another tenant by intercepting or otherwise retrieving sensitive, identity data that is not meant to be shared with that tenant.

Additionally, to perform identity migration conventionally, a source tenant administrator may download full identities for the mailboxes and use offline means (e.g., email) to transfer the identity data to a target tenant administrator, where that target tenant administrator then manually crafts the identities to match the requirements of mailbox migrations. Using such offline means for transferring data, leaves the identity data vulnerable to attack. In contrast, implementation of the system 106 described herein provides a secure path to migrate the identities such that the identity data is not capable of being exposed to any other entity besides the respective source and target tenants 102 themselves and the system 106 as the requests are sent to and processed by the system 102. Thus, implementation of this system 106 for identity migration eliminates another potential attack surface by removing conventional offline methods of data transfer and communication.

While the example operating environment 100 described above includes a multi-tenancy cloud computing system and the example scenarios include requests for jobs associated with data migration between tenants, implementation of the system and deduplication methods described herein may extend to other services or features of services that execute any type of long running job or task in the background while an endpoint front loads (e.g., receives) the requests for the respective long running job or task. These types of services or features thereof will similarly benefit from the reduction in processing, conservation of memory, and increased security.

Having described various systems that may be employed by the aspects disclosed herein, this disclosure will now describe one or more methods that may be performed by various aspects of the disclosure. In aspects, methods 200, 300, 400, 500, and 600 may be performed by one or more components of a distributed network, such as the one or more services of system 106 shown in operating environment 100 of FIG. 1. However, methods 200, 300, 400, and 600 are not limited to such examples. In other aspects, methods 200, 300, 400, 500, and 600 may be performed by a single device or component that integrates the functionality of the components or services of system 106.

Figure 2:
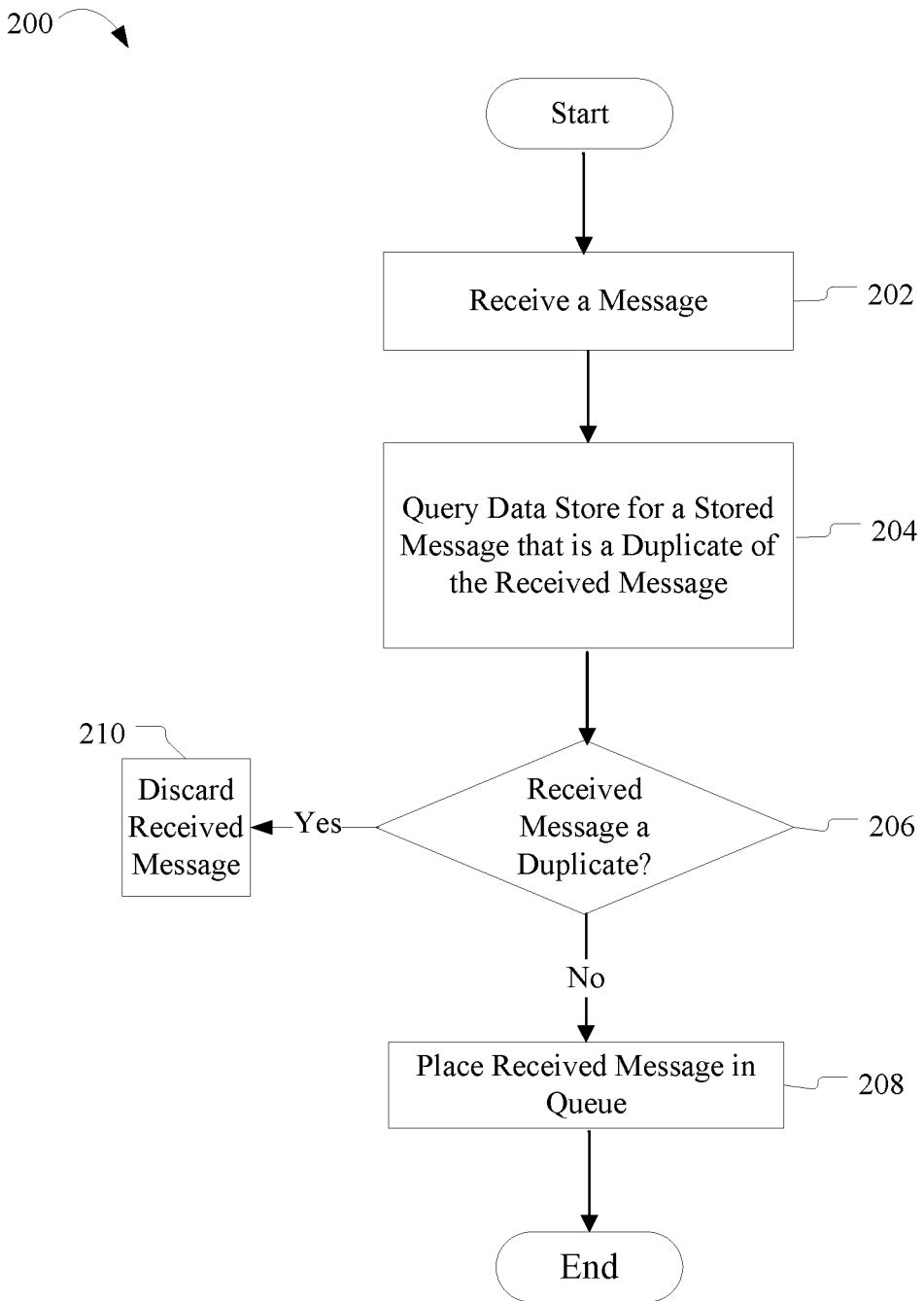
FIG. 2 illustrates an example of a first deduplication method.

FIG. 2 illustrates an example of a first deduplication method that may be performed by one or more services of the system 106. In aspects, method 200 may be performed by the endpoint 108 of cloud system 106 described in detail with reference to FIG. 1. Example method 200 begins at operation 202, where a message is received at the endpoint 108. Messages, such as the received message, may be a form in which a request is provided to and/or received at the system 106 from a client. In some aspects, the request may be for a job to be run in the system 106 (e.g., a job request), where the job is comprised one or more tasks. The jobs will typically involve performing jobs on data that is stored in locations that are accessible via the system 106 (e.g., data associated with one of the clients, such as data stored in one of the tenant-specific data stores 116 of tenants 102, among other examples). In some examples, the requesting client may be a source (e.g., a producer) of the data on which the job is to be performed. The job request may indicate the following parameters: a type of job to be performed, a source of the data on which the job is to be performed, a destination for the data during or following the performance of the job, and/or a manipulation to be performed on the data as part of the job. As discussed above, the request may be received as a message. Therefore, these above-listed parameters of the job request may be included as corresponding attributes of the received message. For example, the corresponding attributes may include a request type, a source identifier, a target identifier, and a data manipulation type. Depending on the request type one or more additional parameters may be included in the request, and thus corresponding one or more additional attributes may be included in the received message (e.g., a group identity and/or scope attribute defined in the example scenario described with reference to FIG. 5 below).

Next, the endpoint 108 checks whether the received message is a duplicate message. To do so, at operation 204, the endpoint 108 queries the data store 114 for a stored message that is a duplicate of the received message. For example, using the attributes of the received message, the endpoint 108 queries the data store 114 that stores previously received messages for job requests. In an aspect, the request type attribute from the received message that indicates the type of job to be completed may be used as input to perform a first query on the data store 114. This first query acts an initial filter to return, as results of the first query, a subset of the stored messages in the data store 114 that are associated with a same type of job (e.g., similar stored messages). If one or more similar stored messages are returned in the subset, one or more additional attributes from the received message, such as the source identifier, target identifier, and manipulation type, may be used as input to perform a second query on the subset of stored messages returned as results of the first query to determine whether one of these similar stored messages in the subset requested the exact same job to be completed. In other words, the second query acts as a second filter to find a stored message with an exact job match to the received message. In other aspects, a single query may be performed to identify any duplicate messages and the inputs to such a query include enough information (e.g., message attributes) that if a result message to the query is returned, that result message is considered a duplicate.

In some examples, the queries (e.g., single query or first/second queries) may be bound by a time interval such that messages returned in response to the query are limited to those submitted within the time interval. In an aspect, the time interval may be a predefined interval based on an amount of time it generally takes to complete a job or task of a job. As one example, if a job should normally complete within an hour, then the time interval may be one hour. In additional or alternative examples, the queries may be performed on a portion of the stored messages in the data store 114 that have an active status meaning that the job and tasks thereof have not yet been completed. For example, the stored messages may first be filtered based on status prior to performing the queries.

If, based on the querying, at decision 206, the endpoint 108 determines that the received message is not a duplicate, the method proceeds to operation 208. For example, if no stored messages are returned as results of the first query, then at decision 206, the endpoint 108 determines that that the received message is not a duplicate and proceeds to operation 208. Similarly, if a subset of stored messages are returned as results of the first query but, based on the second query, none of these messages are an exact job match to the received message, then at decision 206, the endpoint 108 determines that the received message is not a duplicate and proceeds to operation 208. At operation 208, the received message may be placed in (e.g., pushed or transmitted to) the queue 110.

Alternatively, if based on the querying at operation 204, a stored message is returned that is a duplicate of the received message, then at decision 206, the endpoint 108 determines that the received message is a duplicate and proceeds to operation 210 to discard the received message. In some examples, as part of discarding the received message, the endpoint 108 may also send a notification to the requesting client to indicate the request has failed and the job or task will not be completed. The notification may be a HyperText Transfer Protocol (HTTP) 400 Bad Request, for example. In further examples, the notification may indicate that the request failed because it was a duplicate request to a request previously received. Additional details of the previously received duplicate request, such as the time that the previous request was submitted, may also be provided in the notification.

Stored messages in the data store 114 represent jobs that have been performed, are in the process of being performed, and/or will be performed in the future by one of the worker roles 112. These stored messages are based on previous requests that were received by the system 106 and may be messages that were themselves determined not to be duplicate messages through similar operations disclosed by method 200. Accordingly, if a duplicative message was not discarded, the same tasks associated with the job may be performed twice. For example, the tasks would be performed once based on the stored message, and then the same tasks would be performed again (for the second time) after the received duplicate message was stored and processed. Therefore, discarding the duplicative received message prevents the new message from being unnecessarily stored and executed. This conserves both memory and processing resources that would otherwise be consumed by storing and processing this message to perform the tasks of this same job twice, as well as prevents any further resources that would be expended having to undo or reverse the duplicated job. Additionally, this increases security of the system 106, particularly, if this duplicative received message was submitted as part of a DOS or DDOS attack attempting to overload the system 106.

Figure 3:
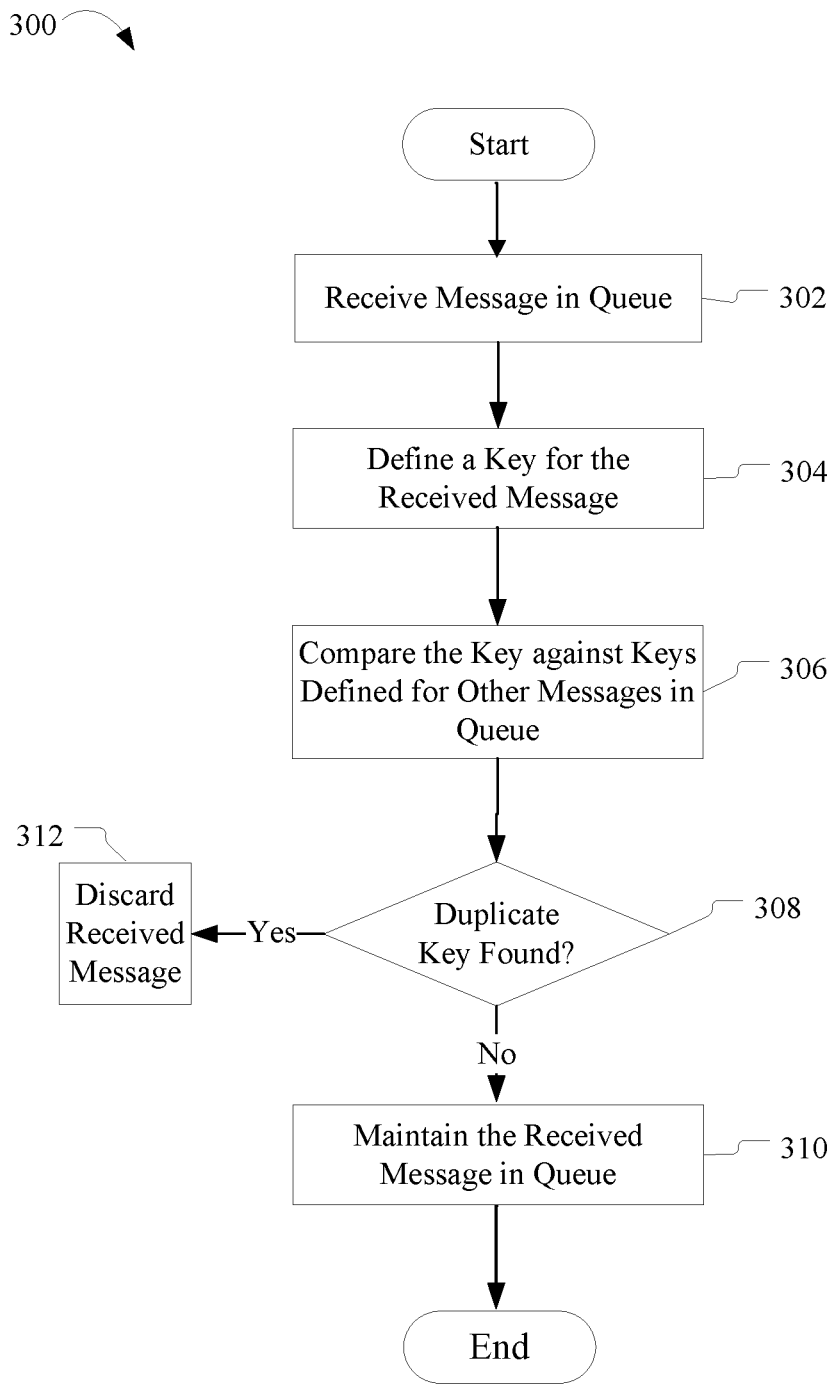
FIG. 3 illustrates an example of a second deduplication method.

FIG. 3 illustrates an example of a second deduplication method implemented by one or more services of the system 106. In aspects, method 300 may be performed by the endpoint 108, the queue 110, and/or another component of the system 106, described in detail with reference to FIG. 1, after the message is placed in (or received at) the queue 110. Example method 300 begins at operation 302, where a message is received at the queue 110. The message may be received from the endpoint 108, the endpoint 108 having received the message from a client as a form of request. For example, as discussed in detail above with reference to FIG. 2, the request may be a job request received at the endpoint 108 in message form (e.g., as a message), where parameters of the job request may be included as attributes of the received message.

A key is defined for the received message at operation 304. The key may be defined on the fly based on content of the received message. For example, the key may include a combination of two or more attributes of the received message that uniquely defines the associated job. In some aspects, the attributes may be concatenated in a sequential fashion to form the key.

At operation 306, the key defined for the received message at operation 304 may be compared against keys defined for other messages in the queue 110 (e.g., other messages on flight in the queue 110). The keys for the other messages may have been defined in a similar or same manner to the key defined for the received message, as described with reference to operation 304, such that the keys uniquely define associated jobs for each of the other messages. Based on the comparison performed at operation 306, a determination of whether the key defined for the received message is a duplicate key of (e.g., matches) one of the keys defined for the other messages is then made at decision 308.

If at decision 308, a determination is made that the key defined for the received message is not a duplicate key, the received message may be maintained in the queue 110 at operation 310. Alternatively, if at decision 308, a determination is made that the key defined for the received message is a duplicate key, then the received message is discarded at operation 312. In some examples, as part of discarding the received message, the endpoint 108 may also send a notification to the requesting client to indicate the request has failed and the job or task will not be completed. The notification may be the same type of notification discussed above.

The other messages on flight in the queue 110 may represent requests for jobs that have been received at the endpoint 108 and provided to the queue 110 prior to the received message. As described above, the keys for these other messages uniquely define their associated job. Therefore, if the key defined for the received message matches a key for one of these other messages on flight in the queue 110, the jobs of these "matching" messages are the same (e.g. are duplicative). Accordingly, if the duplicative received message was not discarded and both "matching" messages remained in the queue, this may cause the same job tasks to be performed twice. For example, both messages may be retrieved from the queue 110, stored in database 114, and eventually retrieved one at a time for processing and execution causing the tasks to be performed twice. Therefore, discarding the duplicative received message prevents this message from being unnecessarily stored and executed. This conserves both memory and processing resources that would otherwise be consumed by storing and processing this message to perform these same job tasks twice, as well as prevents any further resources that would be expended having to undo or reverse the duplicated job. Additionally, this increases security of the system 106, particularly, if this duplicative received message was submitted as part of a DOS or DDOS attack attempting to overload the system 106.

In some aspects, the second deduplication method (method 300) may be implemented on its own (e.g., without other deduplication methods). In other aspects, the second deduplication method may be implemented in conjunction with the first deduplication method (method 200 of FIG. 2). In such aspects, method 200 is initially performed to implement the first deduplication method, and if the received message is placed in the queue at operation 210 of method 200, i.e., not discarded, then method 300 is subsequently performed to implement the second deduplication method. That is, operation 302 of method 300 where the queue 110 receives the message is performed after the endpoint 108 provides the received message to the queue 110 at operation 210 of method 200. When implemented in conjunction with the first deduplication method, this second deduplication at the queue 110 specifically protects against a duplicate request that is issued quickly after the initial request (e.g., within milliseconds) such that the initial request still remains in the queue 110 and has not yet been retrieved by a worker role 112 for storage and thus is not yet stored in the data store 114 causing the duplicate request to be undetected using the first deduplication method.

To provide an illustrative example, a malicious attacker or a malfunctioning script may submit a plurality of duplicate requests (e.g., 10 requests) in quick succession that are received as messages at the endpoint 108, each message received within a few milliseconds of each other. Therefore, because messages pushed to the queue 110 from the endpoint 108 remain in the queue 110 for at least a few milliseconds, when the first deduplication method is performed upon receipt of the second, third, fourth, and up to the tenth message, any of the preceding messages that would be determined as duplicate messages have been transmitted to, but not yet retrieved from the queue 110. Therefore, when the first deduplication is performed, none of the duplicate messages have been stored in the data store 114, and thus the first deduplication method would erroneously indicate that the message is not a duplicate causing the endpoint 108 to push or transmit the message to the queue 110. By implementing the second deduplication method at the queue 110, these duplicate messages that slipped past the first deduplication method based on timing of message receipt, may now be identified based on a duplicity of the keys defined for and compared across the messages at the queue 110, and discarded before being retrieved by a worker role 112 for storage in the data store 114.

In further aspects, the second deduplication method or both the first and second deduplication methods can be implemented with yet another deduplication method, such as the third deduplication method described in FIG. 4 below.

Figure 4:
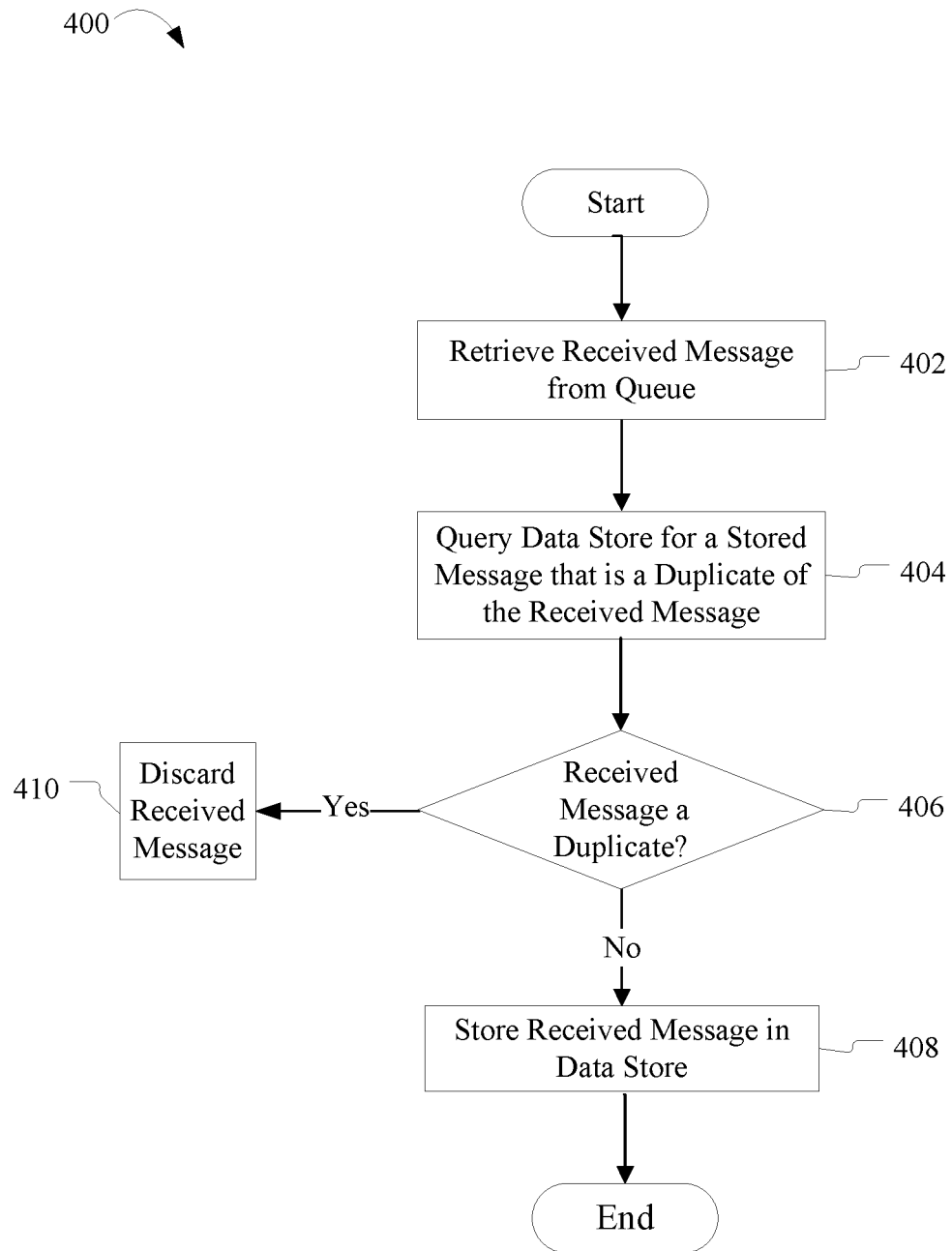
FIG. 4 illustrates an example of a third deduplication method.

FIG. 4 illustrates an example of a third deduplication method implemented by one or more services of the system 106. In aspects, method 400 may be performed by one of the worker roles 112 of the system 106 described in detail with reference to FIG. 1. Example method 400 begins at operation 402, where one of the worker roles 112 retrieves the received message from the queue 110.

Next, the worker role checks whether the received message is a duplicate message. To do so, at operation 404, the worker role 112 may query the data store 114 for a stored message that is a duplicate of the received message. The worker role 112 may query the data store 114 based on the attributes of the received message, and use similar query techniques as performed by the endpoint 108 when querying the data store 114 at operation 204 of method 200. For example, the worker role 112 may submit a first query to return a subset of similar stored messages based on request type (e.g., based on job type), and then perform a second query on the subset returned by the first query, if any, to determine whether one of these similar stored messages requested the exact same job to be completed (e.g., based on one or more additional attributes such as the source identifier, target identifier, and/or data manipulation type). In other aspects, a single query may be performed to identify any duplicate messages and the inputs to such a query include enough information (e.g., message attributes) that if a result message to the query is returned, that result message is considered a duplicate.

If no exact match is discovered, then at decision 406, the worker role 112 determines that the received message is not a duplicate and proceeds to operation 408. For example, if no stored messages are returned as results of the first query, then at decision 406, the worker role 112 determines that the received message is not a duplicate and proceeds to operation 408. Similarly, if a subset of stored messages are returned as results of the first query but, based on the second query, none of these messages are an exact job match to the received message, then at decision 406, the worker role 112 determines that the received message is not a duplicate and proceed to operation 408.

At operation 408, the received message may be stored in the data store 114. For example, the received message may be pushed to the data store 114 for storage therein. As described in more detail with reference to FIG. 5, after the received message is stored, one of the worker roles 112 later retrieves the received message from the data store 114 for processing to complete the job by determining and executing the tasks thereof, where a status of the received message can be continuously updated in the data store 114 to reflect a progress of the work that is viewable by at least the requesting client.

Alternatively, if based on the query of the data store 114 at operation 404, a stored message is returned that is a duplicate of the received message, then at decision 406, the worker role 112 determines that the received message is a duplicate and proceeds to operation 410 to discard the received message. In some examples, as part of discarding the received message, the worker role 112 may trigger the endpoint 108 to send a notification to the requesting client to indicate the request has failed and the job will not be completed. The notification may be similar to the notification discussed above. As previously discussed with reference to FIG. 2, stored messages in the data store 114 may represent jobs that have been performed, are in the process of being performed or will be performed in the future by one of the worker roles 112. These stored messages are based on previous requests that were received by system 106 and were themselves determined not to be duplicate messages through similar operations disclosed by at least method 400 (and optionally also methods 200 and/or 300). Accordingly, if a duplicative message was not discarded, this would cause the same job tasks to be performed twice. For example, tasks associated with the job would be performed once based on the stored message that the received message was to be determined to be a duplicate of, and then the same tasks would be performed again (for the second time) after the received message was stored and later retrieved for processing by one of the worker roles 112. Therefore, discarding the duplicative received message at operation 410 prevents this message from being unnecessarily stored and executed. This conserves both memory and processing resources that would otherwise be consumed by storing and processing this message to perform these same job tasks twice, as well as prevents any further resources that would be expended having to undo or reverse the duplicated job. Additionally, this increases security of the system 106, particularly, if this duplicative received message was submitted as part of a DOS or DDOS attack attempting to overload the system 106.

In some aspects, the third deduplication method (method 400) may be performed on its own (e.g., without other deduplication methods). In other aspects, the third deduplication method may be implemented in conjunction with one or both of the first deduplication method (method 200 of FIG. 2) and the second deduplication method (method 300 of FIG. 3).

For example, if implemented only with the first deduplication method, method 200 may be initially performed to implement the first deduplication method, and if the received message is placed in (e.g., provided to) the queue at operation 210 of method 200, then the third deduplication method is subsequently performed. That is, operation 402 of method 400 where the worker role 112 retrieves the message from the queue 110 may be performed after the endpoint 108 provides the received message to the queue 110 at operation 210 of method 200. Therefore, when the third deduplication method is implemented with at least the first deduplication method, the querying performed at operation 404 may be a requerying of the data store 114 (e.g., a separate, later performed query than the query performed at operation 204).

As another example, if implemented with the second deduplication method either alone or in further conjunction with the first deduplication method, the third deduplication method may be performed subsequently to the operations of method 300. That is, operation 402 of method 400 where the worker role 112 retrieves the message from the queue may be performed after the queue maintains the message in the queue at operation 310 of method 300 (i.e., rather than discards the received message).

If implemented in conjunction with the first and/or second deduplication methods, this third deduplication specifically protects against a duplicate request that was received at the endpoint 108 in between the initial request's retrieval from the queue 110 and storing to the data store 114 causing the duplicate request to be undetected using the first and/or the second deduplication method.

FIG. 5 illustrates an example of a system flow diagram 500 where the first, second, and third deduplication methods are implemented for distributed deduplication of incoming requests. In other words, system flow diagram 500 embodies a method in which each of the deduplication levels are employed. The example operating environment shown in system flow diagram 500 is similar to the example operating environment 100 of FIG. 1 comprising the system 106 that is multi-tenant cloud computing system providing services to the tenants 102, including the first tenant 102A, the second tenant 102B, and up to the $N^{th}$ tenant 102C over the network 104. Each of the tenants may include tenant-specific data stores 116 (e.g., tenant shards).

In an example scenario, a first entity (e.g., company ABC) may be at least partially acquiring or merging with a second entity (e.g., company 123). Both the first entity and the second entity may be tenants 102 of the system 106. For example, first tenant 102A may be comprised of a group of users associated with the first entity and second tenant 102B may be comprised of a group of users associated with the second entity. As part of the acquisition or merger, a group of one or more mailbox identities representative of users from the second tenant 102B may need to be migrated over to the first tenant 102A. As one example, the identity of a mailbox of the second tenant 102B "firstname.lastname@company123.com" may need to be copied over to the first tenant 102A and changed to "firstname.lastname@companyABC.com" on a particular day. Thus, in this example scenario, the second tenant 102B may be referred to as the source tenant and the first tenant 102A may be referred to as the target tenant.

In an alternative example scenario, both the first tenant 102A and the second tenant 102B may be associated with a same entity, but due to sheer size of the entity, separation of governance, or geographic spread of the entity (given the regulations associated with different geographic regions), among other examples, the entity has multiple tenancies. If a department of the entity comprised of one or more users and initially associated with second tenant 102B is moving to another geographic location associated with first tenant 102A or is growing in size such that a new tenancy (e.g., $N^{th}$ tenant 102N) is required, mailbox identities of those users within the department may need to be migrated over from the second tenant 102B to the first tenant 102A or $N^{th}$ tenant 102N, respectively. Thus, in this alternative scenario, the second tenant 102B may be referred to as the source tenant and the first tenant 102A or $N^{th}$ tenant 102N may be referred to as the target tenant.

Referring to either of the example scenarios provided above, to migrate the mailbox identities, a new security group may be created in the source tenant by a source tenant administrator. The new security group includes mailboxes whose identities are to be migrated to the target tenant. This security group of mailboxes may also referred to as the scope. Also, in the target tenant, a target tenant administrator may create mail users that correspond to the mailboxes that are to be migrated from the source tenant to the target tenant. As part of the migration, identities of the mailboxes from the source tenant may be copied such that the associated values of those identities may then be copied to the mail users created in the target tenant. However, the migration tasks involved may not be able to be performed at once, and thus a plurality of requests may be utilized. In some examples, a tenant administrator for the source tenant may utilize an associated computing device to schedule and transmit the requests accordingly to the system 106 over the network 104. In other examples, the tenant administrator for the target tenant may schedule and transmit one or more of these requests.

Example requests may include an initial synchronization request, an upload request, a map request, and a write request, where one or more migration tasks to be performed by the system 106 (e.g., by the endpoint 108 and/or one of the worker roles 112) may be associated with each request. For example, and as described in more detail with respect to FIG. 6 below, validation, acceptance, and copy identity tasks may be associated with the initial synchronization request, tasks to upload mapping data may be associated with the upload request, tasks to map identities to mail users may be associated with the map request, and tasks to apply identity attributes to mapped mail users may be associated with the write request.

As one or more of these requests are received at the system 106, the following operations may be performed for each request. Beginning at operation 504, a request may be received in a form of a message 502 at the endpoint 108 of the system 106 from one of the tenants 102 (e.g., second tenant 102B) over the network 104. The endpoint 108 may perform a first level of deduplication to check if the message 502 is a duplicate message at operation 506. The first level of deduplication may be similar to the first deduplication method described as method 200 in FIG. 2. For example, the endpoint 108 may query the data store 114 for a stored message that is a duplicate of the message 502 as described in detail at operation 204 of method 200. At decision 508, a determination is made whether or not the message 502 is a duplicate message based on the check performed at operation 506. If the message 502 is determined to be a duplicate at decision 508, then the message 502 is discarded at operation 510. Otherwise, if the message 502 is determined to not be a duplicate message at decision 508, then the message 502 may be placed in (e.g., provided to) the queue 110 at operation 512.

If the message 502 is placed in the queue 110, a second level of deduplication may be performed by the endpoint 108 and/or the queue 110 while the message 502 is at the queue 110. The second level of deduplication may be similar to the second deduplication method described as method 300 in FIG. 3. First, upon receipt of the message at the queue 110 at operation 514, a key is defined for the message 502 at operation 516. For example, the key may be defined based on content of the message 502 such that the key uniquely defines the associated job request as described in detail at operation 304 of method 300. Next, at operation 518, the key is compared against keys similarly defined for other messages that were received just prior to the message 502 and are on flight in the queue 110.

Based on the comparison, a determination of whether the key for the message 502 is a duplicate key (e.g., matches one of the other keys) may be made at decision 520. If the key for the message 502 is determined to be a duplicate key at decision 520, then the message 502 is discarded at operation 522. Otherwise, if the key for the message 502 is determined to not be a duplicate key at decision 520, then the message 502 may be maintained in the queue 110 at operation 524.

If the message 502 is maintained in the queue 110 at operation 524, one of the worker roles 112, such as first worker role 112A, may retrieve the message 502 from the queue 110 at operation 526 and perform a third level of deduplication. The third level of deduplication may be similar to the third deduplication method described as method 400 in FIG. 4. For example, the first worker role 112A may check whether the message 502 is a duplicate at operation 528 by querying the data store 114 for a stored message that is a duplicate of the message 502, as described in detail at operation 404 of method 400. In this example, the query performed at operation 528 may be a requerying of the data store 114 (e.g., a separate, later performed query than the query performed in conjunction with operation 506). At decision 530, a determination may be made as to whether or not the message 502 is a duplicate message based on the check performed at operation 528. If the message 502 is determined to be a duplicate message at decision 526, then the message 502 is discarded at operation 532. Otherwise, if the message 502 is determined to not be a duplicate message at decision 530, then the message 502 may be stored in data store 114 at operation 534.

At a later time, one of the worker roles 112 may retrieve the message 502 from the data store 114 at operation 536 for processing. For example, as illustrated, first worker role 112A may retrieve the message 502 from the data store 114. However, in other examples, the worker role 112 that retrieves the message 502 from the data store 114 for processing does not have to be the same worker role 112 that performed the third level of deduplication.

At operation 538, a lock may be acquired for the message 502. While any of the worker roles 112 may be able to read data, such as the data of the message 502, in order to write data (e.g., to process message 502 to determine and execute tasks) the first worker role 112A must be the unique owner of the data. In an aspect, the first worker role 112A may become a unique owner of the data through a "tag" feature on the data that serves as the lock on the message 502 to prevent any other worker role from similarly retrieving and processing the message 502 at the same time as the first worker role 112A.

The first worker role 112A may then process the message 502 to determine one or more tasks to be performed at operation 540. The manner in which the message 502 is processed may be job dependent. Then, at operation 542, the first worker role 112A may execute the tasks determined by the processing of the message 502. In the illustrative example of identity migration, one or more example tasks determined by the processing of the message 502 (as well as tasks determined by the processing of one or more additional messages received that altogether represent the initial synchronization request, upload request, map request and write request, for example) are described in detail with respect to FIG. 6.

Once the task is executed, the first worker role 112A can provide a status update to the data store 114 for storage in association with the message at operation 544. For example, the status update may indicate that the first worker role 112A has completed the task (e.g., the first worker role 112A has synchronized or migrated one identity). In some aspects, the first worker role 112A may provide more frequent updates to the data store 114 throughout the processing and execution operations.

In one example, an administrator or other user of the second tenant 102B may interface with the system 106 via the endpoint 108 to request for status updates of the message 502. For example, the endpoint 108 may obtain the status stored in association with the message 502 at the data store 114 and present them to the administrator in a variety of different ways. In some aspects, the status may displayed through a user interface or similar view. In other aspects, the status may be provided in a report format to the administrator. The status may include information such as whether the job or task is completed, in progress, or not yet begun, what the job or task accomplished if completed, and any reasons for task failure if a task failed.

The above described example in FIG. 5 is a non-limiting, non-exclusive example where each of the first, second, and third deduplication levels or methods are implemented. In other examples, only one of the deduplication methods or a combination of two of the three deduplication methods may be implemented.

Additionally, while the scenarios described above include requests for jobs associated with the migration of identities from a source tenant to a target tenant, implementation of the system and deduplication methods described herein may extend to other services or features of services that execute any type of long running job or task in the background while an endpoint front loads (e.g., receives) the requests for the respective long running job or task. These types of services or features thereof will similarly benefit from the reduction in processing, conservation of memory, and increased security.

Figure 6:
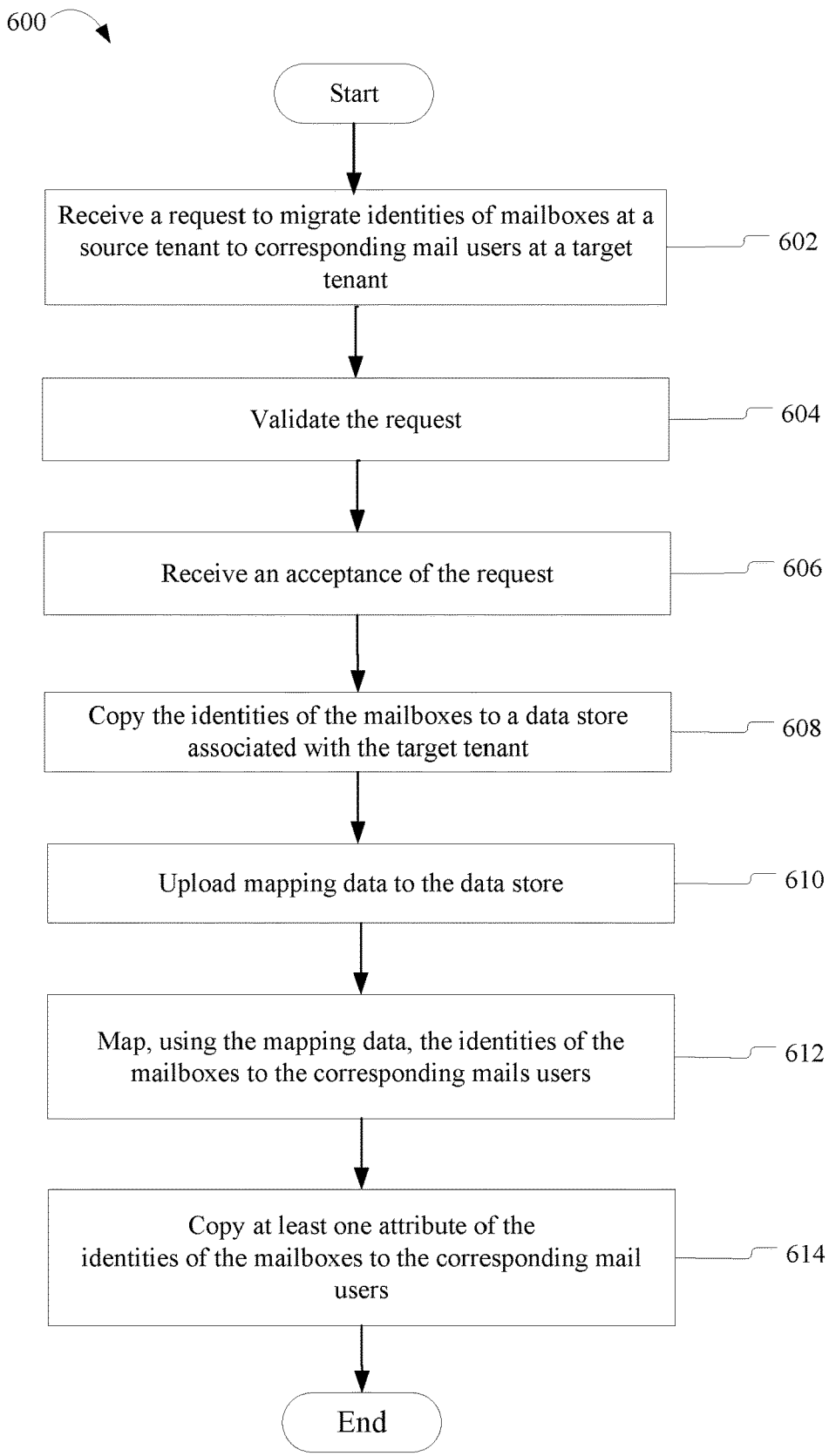
FIG. 6 illustrates an example method for identity migration from a source tenant to a target tenant.

FIG. 6 illustrates an example method 600 for identity migration from a source tenant to a target tenant. Identity migration may be one example service provided by one or more components of the system 106 described in FIG. 1, including at least the endpoint 108 and one or more of the worker roles 112.

Continuing with the example scenario described above with reference to FIG. 5, mailbox identities may be migrated from the source tenant (e.g., the second tenant 102B) to the target tenant (e.g., the first tenant 102A). Prior to the system 106 performing the method 600, a tenant administrator of the source tenant may create a new security group in the source tenant. The new security group may include mailboxes that are to be migrated from the source tenant to the target tenant, each of the mailboxes having an identity. This security group of mailboxes may also be referred to as the scope. In some examples, the security group of mailboxes or scope may be stored in a tenant shard of the source tenant, referred to hereafter as the source tenant shard (e.g., in the second tenant-specific data store 116B when the second tenant 102B is the source tenant). In addition, a tenant administrator of the target tenant may create corresponding mail users for those mailboxes that are to be migrated from the source tenant to the target tenant.

In some examples, the tenant administrator for the source tenant utilizes an associated computing device to schedule and/or transmit a plurality of requests to the system 106 associated with the identity migration, including an initial synchronization request, an upload request, a map request, and a write request. In other examples, the tenant administrator for the target tenant may schedule and transmit one or more of these requests. In further examples, only one request may be received, or any variation in number of requests may be received to perform the tasks associated with the identity migration.

In some aspects, upon receipt of each request at the system 106, one or more of the deduplication methods described in detail above with reference to FIGS. 2-5 may be implemented to ensure that these requests are not duplicates. Once determined to not be duplicates, these requests (e.g., in the message form in which they are received) may be stored in data store 114 for later retrieval by a worker role 112 to perform the tasks associated with each request (e.g., to perform at least some of the operations discussed below with reference to method 600). In some examples, the requests are retrieved by the worker role 112 in a sequential order, where the worker role 112 cannot perform a task associated with a next request until a task associated with a previous request is completed. One example order in which the tasks of the requests are sequentially performed include tasks of the initial synchronization request followed by tasks of the upload request, map request, and write request, respectively.

Example method 600 begins at operation 602, where a request is received from the source tenant to initiate the migration of the identities of the user mailboxes at the source tenant to corresponding mail users at the target tenant. In some examples, the request is an initial identity synchronization request. Upon receipt of the request, the endpoint 108 and/or worker role 112 may begin processing the request to determine and execute one or more tasks, including validation tasks, acceptance tasks, and identity copying tasks associated with the identity synchronization request.

First, the identity synchronization request may be validated at operation 604. As part of the validation, a determination of whether the source tenant and the target tenant are properly configured for identity migration is made. For example, when properly configured, each of the source tenant and the target tenant have enabled identity migration, specified with which tenant they are working with for the identity migration (e.g., the source tenant specifies the target tenant and vice versa), and further specified which direction the identities are to be moved (e.g., exporting from the source tenant and importing to the target tenant). These configuration aspects may increase security by requiring active participation from each tenant involved in the migration. For example, this prevents migration from simply occurring in response to one of tenants (e.g., a target tenant) indicating they want to pull some identities from a source tenant. Instead, the source tenant must also be configured to allow that particular target tenant to do so.

Once validated at operation 604, method 600 may proceed to operation 606 where the initial synchronization request may be provided to the target tenant for acceptance, and such an acceptance of the request may be detected or received from the target tenant. Contrary to conventional push or pull models, this request-acceptance task model reflected in operations 606 and 608, allows tenant administrators from both the source tenant and the target tenant control over the migration, including control over what is specifically being migrated. For example, a worker role 112 may not be able to retrieve the initial synchronization request (e.g., in message form from data store 114) for processing and task execution until the acceptance has been received. While in this example, the initial synchronization request is received from the source tenant and acceptance is provided by the target tenant; in other examples, the initial synchronization request may be received from the target tenant and acceptance may be provided by the source tenant following validation.

After the target tenant accepts the identity synchronization request, the worker role 112 may copy identities of the mailboxes at the source tenant to a data store associated with the target tenant (e.g., the first tenant-specific data store 116A when first tenant 102A is the target tenant) at operation 608. In some examples, and as referred to hereafter with reference to FIG. 6, the data store may be a tenant shard of the target tenant ("a target tenant shard"). For example, the worker role 112 may access the source tenant shard to read mailboxes from the security group created at the source tenant and copy an identity of each of those mailboxes to the target tenant shard. The target tenant shard may be comprised of rows, where each of the identities correspond to a row. For example, a first row may correspond to a first identity of a first mailbox from the security group and a second row may correspond to a second identity of a second mailbox from the security group, etc. The identities may be held in the target tenant shard until the identities are later copied to the mail users created at the target tenant.

At operation 610, the worker role 112 may upload mapping data. In some examples, the mapping data is uploaded responsive to an upload request received from the source tenant. That is, the uploading of mapping data is an example task determined and executed by the worker role 112 upon retrieving (e.g., from the data store 114 in message format) and processing the upload request. In some examples, the mapping data may be uploaded in a file format, such as a comma-separated values (CSV) file, from the source tenant from which the upload request is received. In other examples, the upload request may be received from the target tenant and the mapping data may be uploaded from the target tenant. The worker role 112 may upload the CSV file to the target tenant shard, where the CSV file may be uploaded to a collection of files or data separate from the identities that were copied from the source tenant to the target tenant shard at operation 608. The collection may store the mapping data in a plurality of rows, where the mapping data may include identifiers for the mailboxes whose identities were copied from the source tenant to the target tenant shard at operation 608 (e.g., source identifiers), as well as identifiers for the mail users created at the target tenant that correspond to those mailboxes (e.g., target identifiers). For example, a source identifier for a first mailbox and a target identifier for a first mail user created to correspond to the first mailbox may be stored in a same first row in the collection.

In some aspects, prior to operation 610, the target tenant may obtain information about the identities that were copied from the source tenant to the target tenant shard at operation 608 from a file, such as the CSV file. The target tenant may use the information from the CSV file to create a mapping file. The mapping file may be comprised of first and second columns, where the first column includes identifiers for the mailboxes and the second column includes identifiers for the mail users. Accordingly, each row may include an identifier X for a mailbox and an identifier Y for a mail user to which the mailbox corresponds and is to be mapped to enable migration of an identity of the mailbox to the corresponding mail user. When such information is obtained and used by the target tenant to create the mapping file, the mapping file may be uploaded from the target tenant as part of the mapping data at operation 610.

At operation 612, the worker role 112 may use the mapping data uploaded to the target tenant shard at operation 610 to map the identities of the mailboxes to the corresponding mail users. In some examples, the mapping is performed responsive to a map request received from the source tenant (or in other examples the target tenant). That is, the mapping is an example task determined and executed by the worker role 112 upon retrieving (e.g., from the data store 114 in message format) and processing the map request. Such mapping validates that the identities of the mailboxes copied to the target tenant shard can be matched to the mail users created in the target tenant. As previously discussed, the mapping data may be stored in rows of a collection in the tenant shard, where each row may include a source identifier for a mailbox and a target identifier for a mail user corresponding to that mailbox. Therefore, to perform mapping, each row of the mapping data may be analyzed one by one as follows. To begin, a source identifier for a first mailbox from the security group created at the source tenant may be referenced from the first row of the collection storing the mapping data. The source identifier for the first mailbox may be used to determine whether the first mailbox's associated identity is copied to the target tenant shard (e.g., based on a presence of the source identifier for the first mailbox in a row of a separate collection of the target tenant shard storing the identities). If so, then a target identifier of a first mail user corresponding to the first mailbox may be referenced from the mapping data (e.g., from the same first row as the source identifier of the first mailbox) and used to determine if a mail user exists at the target tenant that has the target identifier. If so, then the mapping was successful, and the first mailbox's associated identity copied to the target tenant shard may be mapped to the corresponding first mail user at the target tenant. This analysis may be repeated until each row of the mapping data has been analyzed.

For identities of the mailboxes that are successfully mapped at operation 612, the method 600 may proceed to operation 614. For remaining identities that are not successfully mapped, if any, the failure is likely due to an error by the source tenant administrator when creating the mapping data that was uploaded at operation 610. Therefore, the source or target tenant administrator, depending on the sender of the requests, may be notified of the error and prompted to provide corrected mapping data (e.g., a new CSV file). In response, the tenant administrator may create and send a new upload request, new map request, and/or new write request. The new upload request may include the corrected mapping data for upload (e.g., causing a return to operation 610). This corrected mapping data may be uploaded by the worker role 112 responsive to the new map request at operation 610 and is used to map the remaining identities of the mailboxes to corresponding mail users responsive to the new map request at operation 612. This process may be repeated until each of the identities of the mailboxes has been successfully mapped.

For each identity successfully mapped at operation 612, the worker role 112 may copy at least one attribute of that identity to the corresponding mail user at the target tenant. In some examples, the copying is performed responsive to a write request received from the source tenant (or in other examples the target tenant). In other words, the application of identity attributes is a task determined and executed upon retrieving (e.g., from the data store 114 in message format) and processing the write request. For example, identity attributes (e.g., values associated with the identity attributes) may be copied from the target tenant shard to the mail user in the target tenant. Examples of the copied attributes may include primary MS/TP address, archive GUI, textured GUI, among other examples. By initially migrating at least a portion of attributes of the identities of the mailboxes from the source tenant to the target tenant, the mailboxes themselves may then later be more seamlessly migrated from the source tenant to the target tenant with little to no communication delivery downtime during the migration of the mailboxes themselves. Additionally, by implementing method 600 for identity migration using system 106, a number of possible attack surfaces for data leakage during the identity migration is reduced.

As one example, by utilizing the tenant-specific data stores 116 or tenant shards, data for the tenants 102 remains separate from one another (e.g., there is not a common data store for the tenant data), which eliminates or at least highly reduces the risk of cross-contamination of data between the tenants 102. As a result, one tenant may not be able to attack another tenant by retrieving sensitive, identity data that is not meant to be shared with that tenant.

Figure 7:
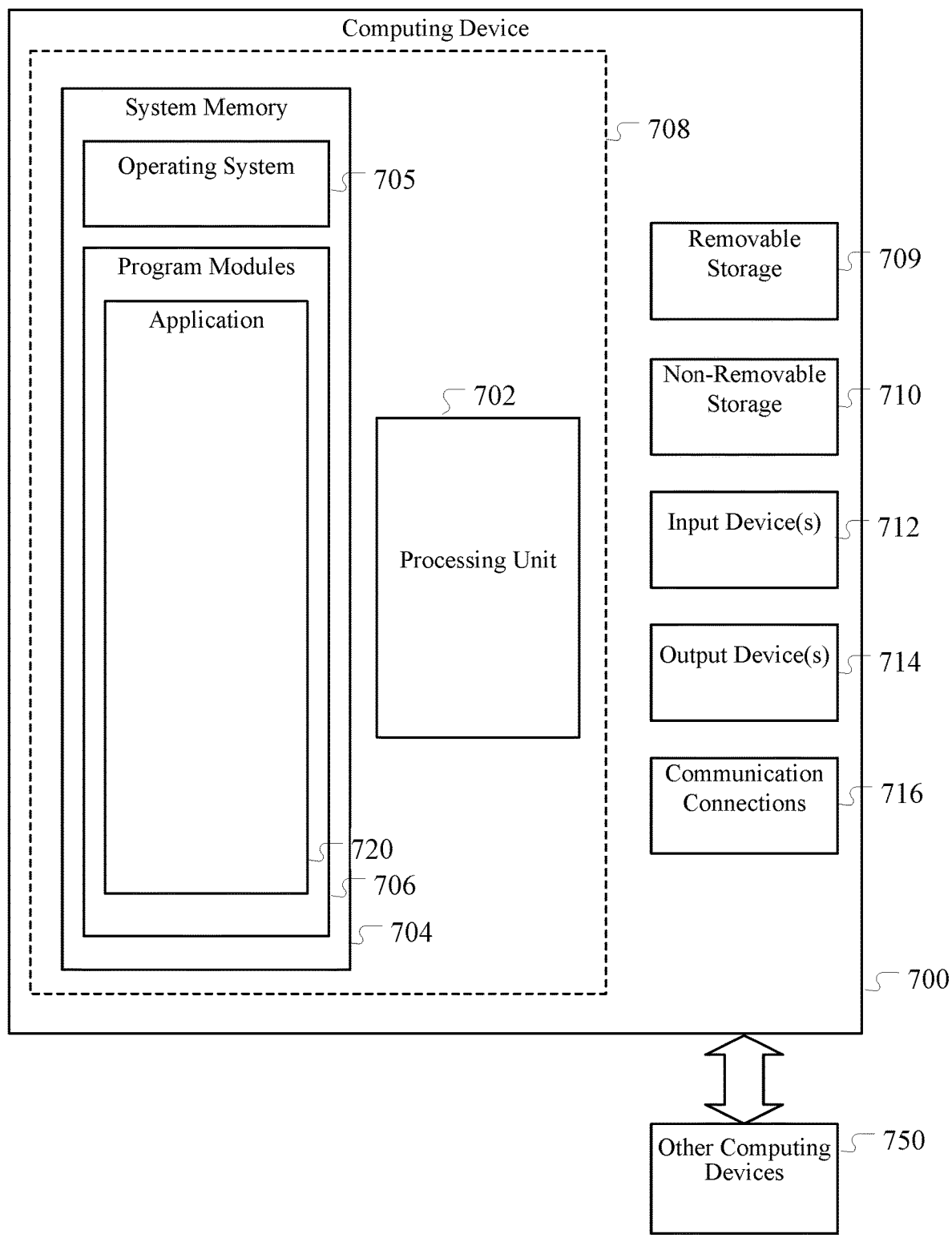
FIG. 7 is a block diagram illustrating example physical components of a computing device with which aspects of the disclosure may be practiced.
Figure 8A:
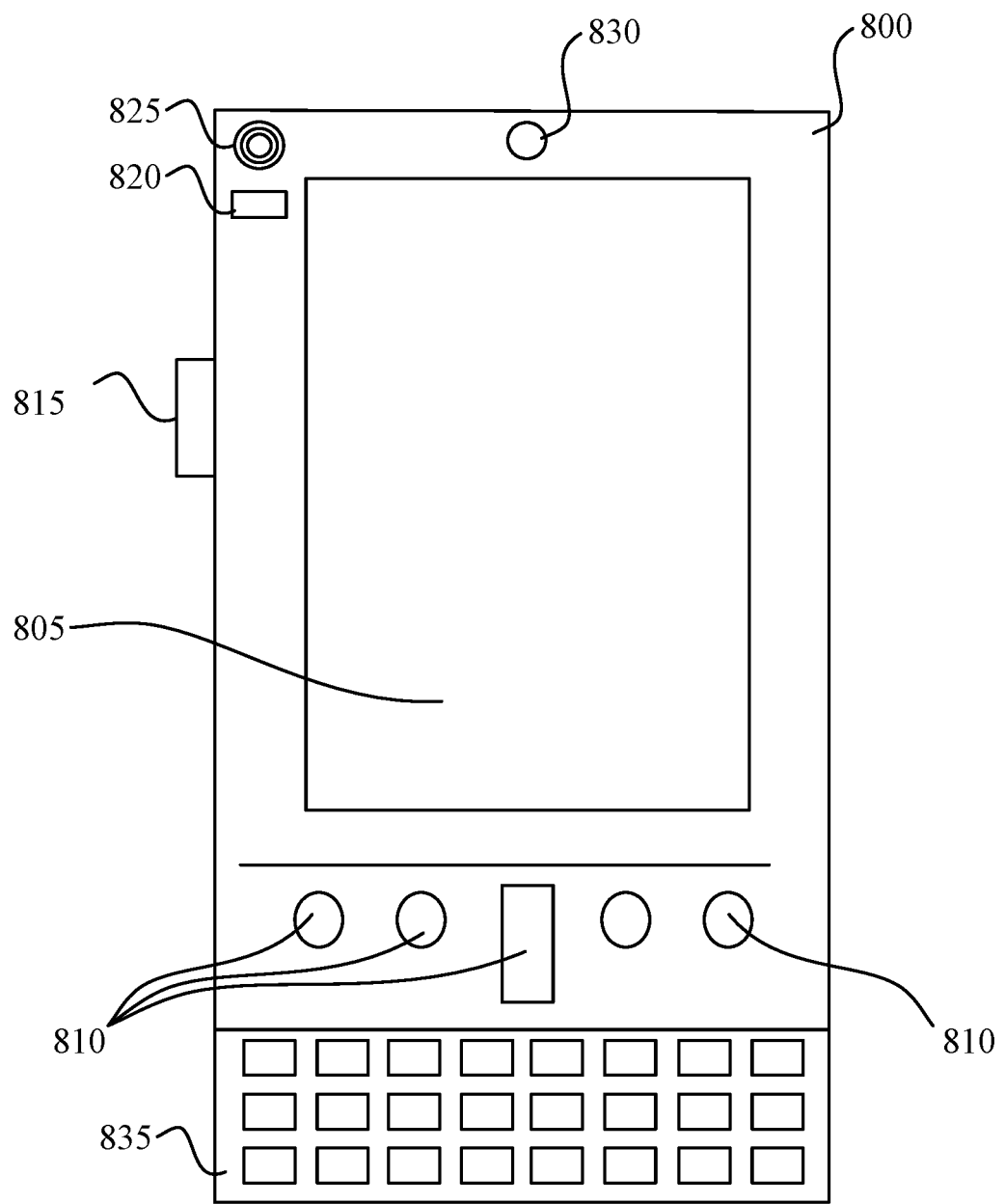
FIGS. 8A and 8B are simplified block diagrams of a mobile computing device with which aspects of the present disclosure may be practiced.
Figure 8B:
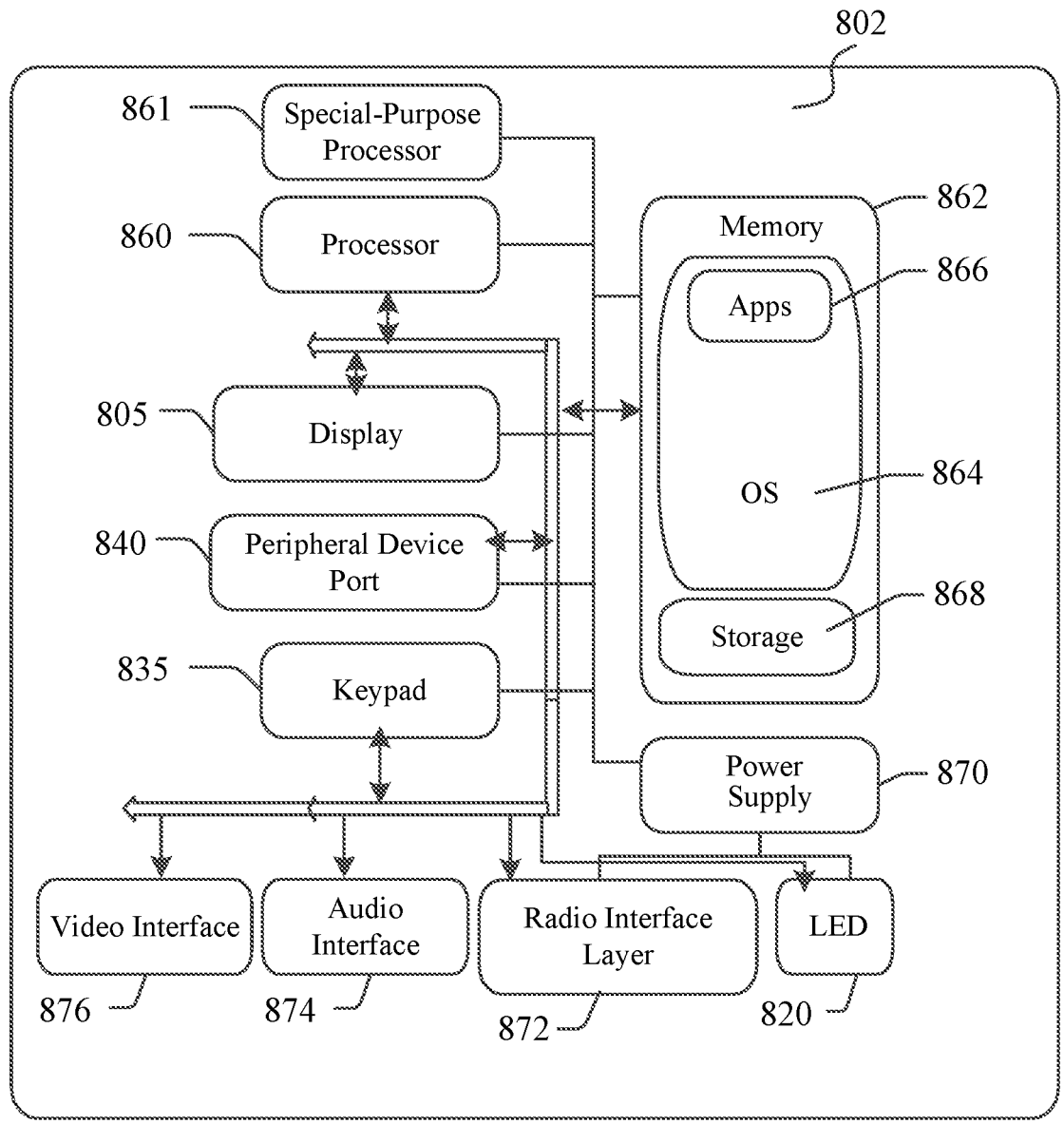

As another example, the system 104 removes the need for conventional offline means for transferring identities from the source tenant administrator to the target tenant administrator to enable copying at the target tenant that leave the identity data vulnerable to attack. Instead, the system 104 provides a secure path to migrate the identities such that the identity data is not capable of being exposed to any other entity besides the respective tenants 102 themselves and the system 106 as the requests are sent to and processed by the system 102. FIGS. 7, 8A, 8B and the associated descriptions provide a discussion of a variety of operating environments in which aspects of the disclosure may be practiced. However, the devices and systems illustrated and discussed with respect to FIGS. 7, 8A, 8B are for purposes of example and illustration and are not limiting of a vast number of computing device configurations that may be utilized for practicing aspects of the disclosure, described herein.

FIG. 7 is a block diagram illustrating physical components (e.g., hardware) of a computing device 700 with which aspects of the disclosure may be practiced. For example, the computing device 700 may illustrate components of a server within a datacenter of the cloud computing system. The computing device components described below may be suitable for the computing devices and systems described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more virtual machines and/or one or more components supported by the systems described herein. The operating system 705, for example, may be suitable for controlling the operation of the computing device 700.

Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, solid-state drives, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include virtual machines, hypervisors, and other types of applications such as electronic mail and contacts applications, word processing applications, spreadsheet applications, database applications, slide presentation applications, drawing or computer-aided application programs, etc.

Furthermore, embodiments, or portions of embodiments, of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As previously discussed, the aspects and functionalities described herein may operate over distributed systems (e.g., cloud-based computing systems such as the system 106 described in FIG. 1 and FIG. 5), where application functionality, memory, data storage and retrieval and various processing functions may be operated remotely from each other over a distributed computing network, such as the Internet or an intranet. Resultantly, tenant administrators or other users, for example, may utilize associated computing devices to interact with the system 106. User interfaces and information of various types may be displayed via on-board computing device displays or via remote display units associated with such computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 8A and 8B below include an example computing device associated with client (e.g., a computing device associated with a tenant administrator or other user), for example, that may be utilized to execute a locally installed application associated with the system 106 or run a web browser through which a web application associated with the system 106 is accessible to send requests to the service and/or request status updates, among other functionalities.

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display).

If included, a side input element 815 allows additional user input. The side input element 815 may be a rotary switch, a button, or any other type of manual input element. Additionally, if included, an on-board camera 830 allows further user input in the form of image data captured using the camera 830. In alternative aspects, mobile computing device 800 may incorporate more or less input elements. For example, the display 805 may not be a touch screen in some embodiments.

In yet another alternative embodiment, the mobile computing device 800 is a portable phone system, such as a cellular phone. The mobile computing device 800 may also include a keypad 835. The keypad 835 may be a physical keypad or a "soft" keypad generated on the touch screen display.

In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device (e.g., a peripheral device). These input and/or output ports are also referred to as peripheral device ports 840 as illustrated in FIG. 8B.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs 866 include phone dialer programs, e-mail programs, personal information management (PIM) programs, word processing programs, spreadsheet programs, Internet browser programs, messaging programs, and so forth. In an aspect, the application programs 866 may also include an application associated with the system 106. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 described with reference to FIG. 8A may be used to provide visual notifications, and/or an audio interface 874 may be used for producing audible notifications via the audio transducer 825 described with reference to FIG. 8A. These devices may be directly coupled to the power supply 870 so that when activated, they remain on for a duration dictated by the notification mechanism even though the processor(s) (e.g., processor 860 and/or special-purpose processor 861) and other components might shut down for conserving battery power. The visual indicator 820 may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 6B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a computing device in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Based on the foregoing, various aspects related to the deduplication of incoming cloud computing requests are described herein. For example, in one aspect, systems are disclosed. An example system includes one or more datacenters comprising one or more processors and one or more memories coupled to the one or more processors. The one or more datacenters may operate an endpoint that receives requests in message form for tasks to be performed by the system, a queue that queues messages received from the endpoint, and a data store that stores the messages from the queue. The system may be configured to perform operations that include receiving, at the endpoint, a request in a form of a message and querying the data store for a stored message that is a duplicate of the received message. The operations may further include, based on the querying, determining the received message is not a duplicate of one of the stored messages in the data store, and placing the received message in the queue.

In some aspects, the received message may be comprised of a plurality of attributes that include one or more of a request type, a source identifier, a target identifier, or a data manipulation type. The data store may queried using one or more of the plurality of attributes as input. As one example, using the request type attribute of the received message as input, a first query on the data store may be performed to return a subset of the stored messages that are associated with a same request type. Then, using one or more additional attributes of the received message as input, a second query may be performed on the subset of the stored messages to determine that the received message is not a duplicate of a stored message from the subset of the stored messages.

In other aspects the operations may include: defining a key for the received message based on one or more attributes of the received message subsequent to placing the received message in the queue; comparing the key defined for the received message to keys defined for other messages in the queue, determining the key defined for the received message is a duplicate key based on the comparing; and discarding the received message from the queue. Alternatively, the operations may include: defining a key for the received message based on one or more attributes of the received message subsequent to placing the received message in the queue; comparing the key defined for the received message to keys defined for other messages in the queue; determining the key defined for the received message is not a duplicate key based on the comparing; and maintaining the received message in the queue, wherein the received message is subsequently retrieved from the queue for storage in the data store.

In other aspects, the operations may include: defining a key for the received message based on one or more attributes of the received message subsequent to placing the received message in the queue; comparing the key defined for the received message to keys defined for other messages in the queue; determining the key defined for the received message is not a duplicate key based on the comparing; maintaining the received message in the queue; retrieving the received message from the queue for storage in the data store; prior to storing the received message in the data store, requerying the data store for a stored message that is a duplicate of the received message; determining the received message is a duplicate of one of the stored messages in the data store based on the requerying; and discarding the received message. Alternatively, the operations may include: defining a key for the received message based on one or more attributes of the received message subsequent to placing the received message in the queue; comparing the key defined for the received message to keys defined for other messages in the queue; determining the key defined for the received message is not a duplicate key based on the comparing; maintaining the received message in the queue; retrieving the received message from the queue for storage in the data store; prior to storing the received message in the data store, requerying the data store for a stored message that is a duplicate of the received message; determining the received message is not a duplicate of one of the stored messages in the data store based on the requerying; and storing the received message in the data store.

Subsequent to the storing of the received message in the data store, the received message may be retrieved from the data store, processed to determine one or more tasks for execution, and the one or more tasks may be executed. Upon execution of the one or more tasks, providing a status update to the data store for storage in association with the received message. A lock may be acquired for the message prior to processing the received message.

In further aspects, the operations may include retrieving the received message from the queue for storage in the data store, requerying the data store for a stored message that is a duplicate of the received message prior to storing the received message in the data store, and determining whether the received message is a duplicate of one of the stored messages in the data store based on the requerying. If the received message is a duplicate, the received message may be discarded, else the received message may be stored in the data store.

In yet further aspects, the operations may include receiving a second request in a form of a second message; querying the data store for a stored message that is a duplicate of the second message; determining the second message is a duplicate of one of the stored messages in the data store based on the querying; and discarding the second message.

In another aspect, methods are disclosed. An example method includes receiving, at an endpoint of a cloud computing system, a request in a form of a message and querying a data store of the cloud computing system that comprises a plurality of stored messages for a stored message that is a duplicate of the received message. The method further includes determining, based on the querying, the received message is not a duplicate of one of the plurality of stored messages in the data store, and placing the received message in a queue of the cloud computing system.

In some aspects, subsequent to placing the received message in the queue, a key for the received message may be defined based on one or more attributes of the received message, and compared to keys defined for other messages in the queue. Based on the comparing, a determination whether the key defined for the received message is a duplicate key may be made. If the key defined for the received message is a duplicate key, the received message may be discarded, else the received message may be maintained in the queue for subsequent retrieval from the queue and storage in the data store.

In other aspects, subsequent to placing the received message in the queue, a key for the received message may be defined based on one or more attributes of the received message, and compared to keys defined for other messages in the queue. Based on the comparing, a determination that the key defined for the received message is not a duplicate key may be made and the received message may be maintained in the queue. The received message may be retrieved from the queue for storage in the data store, and prior to storing the received message in the data store, the data store may be requeried for a stored message that is a duplicate of the received message. Based on the requerying, a determination whether the received message is a duplicate of one of the plurality of stored messages in the data store may be made. If the received message is a duplicate, the received message may be discarded, else the received message may be stored in the data store.

In further aspects, the received message may be retrieved from the queue for storage in the data store, and prior to storing the received message in the data store, the data store may be requeried for a stored message that is a duplicate of the received message. Based on the requerying, a determination whether the received message is a duplicate of one of the plurality of stored messages in the data store may be made. If the received message is a duplicate, the received message may be discarded, else the received message may be stored in the data store.

In yet further aspects, a second request may be received in a form of a second message. The data store may be queried for a stored message that is a duplicate of the second message. Based on the querying, the second message may be determined to be a duplicate of one of the plurality of stored messages in the data store, and the second message may be discarded.

In a further aspect, methods are disclosed. An example method includes receiving, at an endpoint of a cloud computing system, a request in a form of a message, and querying a data store of the cloud computing system that comprises a plurality of stored messages for a stored message that is a duplicate of the received message. The method further includes determining the received message is a duplicate of one of the plurality of stored messages in the data store based on the querying, and discarding the received message.

In some aspects, the received message may include a plurality of attributes that include one or more of a request type, a source identifier, a target identifier, or a data manipulation type. The data store may be queried using one or more of the plurality of attributes as input. For example, using the request type attribute of the received message as input, a first query may be performed on the data store to return, as results of the first query, a subset of stored messages from the plurality of messages that are associated with a same request type. Then, using one or more additional attributes of the received message as input, a second query may be performed on the subset of stored messages to return, as results of the second query, the one of the plurality of stored messages in the data store that the received message is a duplicate of.

Additionally, various aspects related to the migrating mailbox identities are described herein. For example, in one aspect, systems are disclosed. An example system includes at least one processor, and at least one memory coupled to the at least one processor for performing operations. The operations may include receiving at least one request to migrate identities of a plurality of mailboxes of a source tenant to a plurality of mail users of a target tenant, where the plurality of mail users correspond to the plurality of mailboxes. The operations may also include copying the identities of the plurality of mailboxes to a data store associated with the target tenant, uploading mapping data to the data store, and mapping, using the mapping data, the identities of the plurality of mailboxes copied to the data store to the corresponding plurality of mail users of the target tenant. The operations may further include for each of the identities that are mapped to the corresponding mail users of the target tenant, copying at least one attribute of the respective identity from the data store to the respective corresponding mail user of the target tenant.

In some aspects, prior to copying the identities of the plurality of mailboxes to the data store, the at least one request may be validated. Validating the at least one request may include determining the source tenant and the target tenant are configured for the migration. The source tenant and the target tenant may be configured for the migration when each of the source tenant and the target tenant have enabled identity migration, specified the other of the source tenant or the target tenant involved in the identity migration, and specified a direction for the migration of the identities. Also, prior to copying the identities of the plurality of mailboxes to the data store and based on whether the source tenant or the target tenant sent the at least one request, the at least one request may be provided to the other of the source tenant or the target tenant for acceptance. The acceptance may be received from the other of the source tenant or the target tenant.

In other aspects, the data store may be a hidden mailbox that is stored locally at the target tenant and is accessible by the system. The data store may include at least one collection comprised of a plurality of rows. Each of the plurality of rows in a first collection of the data store may store an identity from the copied identities. The mapping data may include a set of source identifiers for the plurality of mailboxes of the source tenant and a set of target identifiers for the mail users of the target tenant. Thus, uploading the mapping data to the data store may include uploading the mapping data for storage in a second collection of the data store, where each of the plurality of rows in the second collection may store a source identifier for a mailbox from the set of source identifiers and a target identifier for a mail user that corresponds to the mailbox from the set of target identifiers. To perform the mapping, for each row of the plurality of rows in the second collection storing the mapping data, the source identifier for the mailbox may be referenced from the set of source identifiers, and a determination is made that an identity for the mailbox is copied in the data store based on a presence of the source identifier for the mailbox in a row of the first collection of the data store. Then, the target identifier for the mail user that corresponds to the mailbox may be referenced from the set of target identifiers, and a determination is made that the mail user exists at the target tenant based on a presence of the target identifier for the mail user at the target tenant.

In further aspects, the target tenant may download from the system a list of the identities copied to the data store and creating a mapping file based on the list, and in response the mapping file may be uploaded to the system as part of the mapping data. At least one of the identities of the plurality of mailboxes copied to the data store may not be mapped to a corresponding mail user of the target tenant, and in response, new mapping data may be uploaded to the data store. Using the new mapping data, the at least one of the identities copied to the data store may be mapped to the corresponding mail user of the target tenant. If the at least one of the identities is mapped to the corresponding mail user, at least one attribute of the respective identity may be copied to the respective corresponding mail user of the target tenant.

In another aspect, methods for migrating mailbox identities are disclosed. An example method includes receiving, by a cloud computing service, at least one request to migrate identities of a plurality of mailboxes of a source tenant to a plurality of mail users of a target tenant, where the plurality of mail users correspond to the plurality of mailboxes, and the source tenant and the target tenant are tenants of the cloud computing service. The method may also include copying, by the cloud computing service, the identities of the plurality of mailboxes to a data store associated with the target tenant, uploading mapping data to the data store, and mapping, by the cloud computing service using the mapping data, the identities of the plurality of mailboxes copied to the data store to the corresponding plurality of mail users of the target tenant. For each of the identities that are mapped to the corresponding mail users of the target tenant, the method may further include, copying, by the cloud computing service, at least one attribute of the respective identity from the data store to the respective corresponding mail user of the target tenant.

In some aspects, the at least one request may be validated. The validation may include determining the source tenant and the target tenant are configured for the migration. In response to validating the at least one request and based on whether the source tenant or the target tenant sent the at least one request, the at least one request may be provided to the other of the source tenant or the target tenant for acceptance, and such acceptance may be received. In response to receiving the acceptance, the identities of the plurality of mailboxes may be copied to the data store.

In other aspects, the data store may include at least one collection comprised of a plurality of rows. Each of the plurality of rows in a first collection of the data store may store an identity from the copied identities. The mapping data may include a set of source identifiers for the plurality of mailboxes of the source tenant and a set of target identifiers for the mail users of the target tenant. Thus, uploading the mapping data to the data store may include uploading the mapping data for storage in a second collection of the data store, where each of the plurality of rows in the second collection of the data store stores a source identifier for a mailbox from the set of source identifiers and a target identifier for a mail user that corresponds to the mailbox from the set of target identifiers. To perform the mapping, for each row of the plurality of rows in the second collection storing the mapping data, the source identifier for the mailbox may be referenced from the set of source identifiers, and a determination made that an identity for the mailbox is copied in the data store based on a presence of the source identifier for the mailbox in a row of the first collection of the data store. Then, the target identifier for the mail user that corresponds to the mailbox may be referenced from the set of target identifiers, and a determination made that the mail user exists at the target tenant based on a presence of the target identifier for the mail user at the target tenant.

In further aspects, the target tenant may download from the cloud computing service a list of the identities copied to the data store and create a mapping file based on the list. In response, the mapping file may be uploaded as part of the mapping data. At least one of the identities of the plurality of mailboxes copied to the data store may not be mapped to a corresponding mail user of the target tenant, and in response, new mapping data may be uploaded to the data store. Using the new mapping data, the at least one of the identities copied to the data store may be copied to the corresponding mail user of the target tenant. If the at least one of the identities is mapped to the corresponding mail user, at least one attribute of the respective identity may be copied to the respective corresponding mail user of the target tenant.

In a further aspect, computer storage media storing instructions for migrating mailbox identities are described. An example computer storage media stores instructions for migrating mailbox identities that, when executed by at least one processor, cause the at least one processor to perform operations. The operations may include receiving at least one request to migrate identities of a plurality of mailboxes of a source tenant to a plurality of mail users of a target tenant, where the plurality of mail users correspond to the plurality of mailboxes. The operations may also include copying the identities of the plurality of mailboxes to a data store associated with the target tenant, uploading mapping data to the data store, and mapping, using the mapping data, the identities of the plurality of mailboxes copied to the data store to the corresponding plurality of mail users of the target tenant. The operations may further include, for each of the identities that are mapped to the corresponding mail users of the target tenant, copying at least one attribute of the respective identity from the data store to the respective corresponding mail user of the target tenant.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computing system comprising:
a message queue;
at least one processor; and
at least one memory storing instructions executable by the at least one processor, wherein the instructions, when executed, cause the computing system to:
receive, at an endpoint, a plurality of electronic messages that include requests for tasks to be performed by the computing system;
store the plurality of electronic messages, received from the endpoint, in a message data store;
store, for each respective electronic message of the plurality of electronic messages, a status identifier that identifies a status of completion of a respective request included in the respective electronic message;
receive, at the endpoint, an additional electronic message that includes a request type attribute and represents a request for the computing system to perform a given task, wherein the request type attribute in the additional electronic message identifies a task type of the given task;
query the message data store based on the status identifiers using a query input that represents the task type;
generate a determination that the additional electronic message is not a duplicate of one or more messages, of the plurality of electronic messages stored in the message data store, based on a comparison of the task type corresponding to the given task to task attributes of the plurality of electronic messages stored in the message data store;
based on the determination that the additional electronic message is not a duplicate, place the additional electronic message in the message queue; and
retrieve the additional electronic message and execute the particular-given task identified in the additional electronic message.

2. The computing system of claim 1, wherein
the additional electronic message includes a task attribute that comprises at least one of:
a source identifier attribute identifying a source of data on which the given task is to be performed,
a target identifier attribute identifying a destination for data on which the given task is to be performed, or
a data manipulation type attribute identifying type of data manipulation performed on the data as part of the given task, and
the query input is based on the task attribute and a time interval corresponding to the given task.

3. The computing system of claim 1, wherein the instructions, when executed, cause the computing system to:
perform a first query on the message data store, using the request type attribute of the additional electronic message as a first query criterion, to return a subset of the plurality of electronic messages that are associated with a same request type indicating a same type of task requested to be performed by the computing system; and
perform a second query on the subset of the plurality of electronic messages, using at least one additional attribute, of the additional electronic message, as a second query criterion, to determine that the additional electronic message is not a duplicate of a stored message from the subset of the plurality of electronic messages.

4. The computing system of claim 1, wherein the instructions, when executed, cause the computing system to:
subsequent to the additional electronic message being placed in the message queue, define a key for the additional electronic message based on the request type task attribute of the additional electronic message;
compare the key defined for the additional electronic message to keys defined for other messages in the message queue; and
based on a determination that the key defined for the additional electronic message is a duplicate key, omit the additional electronic message from the message queue.

5. The computing system of claim 1, wherein the instructions, when executed, cause the computing system to:
subsequent to the additional electronic message being placed in the message queue, define a key for the additional electronic message based on the request type attribute of the additional electronic message;
compare the key defined for the additional electronic message to keys defined for other messages in the message queue; and
based on a determination that the key defined for the additional electronic message is not a duplicate key, maintain the additional electronic message in the message queue, wherein the additional electronic message is subsequently retrieved from the message queue for storage in the message data store.

6. The computing system of claim 1, wherein the instructions, when executed, cause the computing system to:
subsequent to the additional electronic message being placed in the message queue, define a key for the additional electronic message based on the request type task attribute of the additional electronic message;
compare the key defined for the additional electronic message to keys defined for other messages in the message queue; and
based on a determination that the key defined for the additional electronic message is not a duplicate key, maintain the additional electronic message in the message queue;
retrieve the additional electronic message from the message queue for storage in the message data store; and
prior to the additional electronic message being stored in the message data store, requery the message data store to determine that the additional electronic message is a duplicate of one of the plurality of electronic messages in the message data store and discard the additional electronic message.

7. The computing system of claim 1, wherein the instructions, when executed, cause the computing system to:
subsequent to the additional electronic message being placed in the message queue, define a key for the additional electronic message based on the request type task attribute of the additional electronic message;
compare the key defined for the additional electronic message to keys defined for other messages in the message queue; and based on a determination that the key defined for the additional electronic message is not a duplicate key, maintain the additional electronic message in the message queue;

retrieve the additional electronic message from the message queue for storage in the message data store; and prior to the additional electronic message being stored in the message data store, requery the message data store to determine that the additional electronic message is not a duplicate of one of the plurality of electronic messages in the message data store, and store the additional electronic message in the message data store.

8. The computing system of claim 7, wherein the instructions, when executed, cause the computing system to:

subsequent to the additional electronic message being stored in the message data store, retrieve the additional electronic message from the message data store;

processing the additional electronic message to determine the particular given task for execution; and executing the given task.

9. The computing system of claim 1, wherein the instructions, when executed, cause the computing system to:

upon execution of the given task, provide a status update representing the execution of the given task to the message data store for storage in association with the additional electronic message.

10. The computing system of claim 1, wherein the instructions, when executed, cause the computing system to:

query the message data store by filtering the plurality of electronic messages to obtain a filtered set of electronic messages and querying the filtered set of electronic messages based on the query input.

11. The computing system of claim 1, wherein the instructions, when executed, cause the computing system to:

retrieve the additional electronic message from the message queue for storage in the message data store;

prior to the additional electronic message being stored in the message data store, requery the message data store for a stored message that is a duplicate of the additional electronic message; and determine whether the additional electronic message is a duplicate of one of the stored messages in the message data store, wherein if the additional electronic message is a duplicate, the additional electronic message is discarded, else the additional electronic message is stored in the message data store.

12. The computing system of claim 1, wherein the instructions, when executed, cause the computing system to:

receive a second request in a form of a second electronic message;

query the message data store for a stored message that is a duplicate of the electronic second message;

based on the querying, determine the second electronic message is a duplicate of one of the stored messages in the message data store and discard the second electronic message.

13. The computing system of claim 1, wherein each electronic message, of the plurality of electronic messages stored in the message data store, is non-duplicative of other electronic messages in the message data store.

14. The computing system of claim 1, wherein the additional electronic message includes a task attribute other than time, and the instructions, when executed, cause the computing system to:

generate the determination that the additional electronic message is not a duplicate based on the task attribute and a time interval.

15. A method comprising:

receiving, at an endpoint of a cloud computing system, a plurality of electronic messages that include requests for tasks;

storing the plurality of electronic messages, received from the endpoint, in a message data store;

storing, for each respective electronic message of the plurality of electronic messages, a status identifier that identifies a status of completion of a respective request included in the respective electronic message;

receiving, at the endpoint, an additional electronic message that includes a request type attribute and represents a request for the computing system to perform a given task, wherein the request type attribute in the additional electronic message identifies a task type of the given task;

querying the message data store based on the status identifiers using a query input that represents the task type;

generating a determination that the additional electronic message is not a duplicate of one or more messages, of the plurality of electronic messages stored in the message data store, based on a comparison of the task type corresponding to the given task to task attributes of the plurality of electronic messages stored in the message data store;

based on the determination that the additional electronic message is not a duplicate, placing the additional electronic message in a message queue; and retrieving the additional electronic message and execute the given task identified in the additional electronic message.

16. The method of claim 15, further comprising:

subsequent to placing the additional electronic message in the message queue, defining a key for the additional electronic message based on the request type task attribute;

comparing the key defined for the additional electronic message to keys defined for other messages in the message queue; and based on the comparing, determining whether the key defined for the additional electronic message is a duplicate key, wherein if the key defined for the additional electronic message is a duplicate key, the additional electronic message is discarded, else the additional electronic message is maintained in the message queue for subsequent retrieval from the message queue and storage in the message data store.

17. The method of claim 15, further comprising:

subsequent to placing the additional electronic message in the message queue, defining a key for the additional electronic message based on at least one attribute of the additional electronic message;

comparing the key defined for the additional electronic message to keys defined for other messages in the message queue;

based on the comparing, determining the key defined for the additional electronic message is not a duplicate key;

maintaining the additional electronic message in the message queue;

retrieving the additional electronic message from the message queue for storage in the message data store;

prior to storing the additional electronic message in the message data store, requerying the message data store for a stored message that is a duplicate of the additional electronic message; and based on the requerying, determining whether the additional electronic message is a duplicate of one of the plurality of electronic messages in the message data store;

wherein if the additional electronic message is a duplicate, the additional electronic message is discarded, else the additional electronic message is stored in the message data store.

18. The method of claim 15, further comprising:

retrieving the additional electronic message from the message queue for storage in the message data store, prior to storing the additional electronic message in the message data store, requerying the message data store for a stored message that is a duplicate of the additional electronic message; and based on the requerying, determining whether the additional electronic message is a duplicate of one of the plurality of electronic messages in the message data store, wherein if the additional electronic message is a duplicate, the additional electronic message is discarded, else the additional electronic message is stored in the message data store.

19. Computer storage media storing instructions, that when executed by a processor, causes the processor to perform operations comprising:

receiving, at an endpoint, a plurality of electronic messages that include requests for tasks to be performed;

storing the plurality of electronic messages, received from the endpoint, in a message data store;

storing, for each respective electronic message of the plurality of electronic messages, a status identifier that identifies a status of completion of a respective request included in the respective electronic message;

receiving, at the endpoint, an additional electronic message that includes a request type attribute and represents a request to perform a given task, wherein the request type attribute in the additional electronic message identifies a task type of the given task;

querying the message data store based on the status identifiers using a query input that represents the task type;

generating a determination that the additional electronic message is not a duplicate of one or more messages, of the plurality of electronic messages stored in the message data store, based on a comparison of the task type corresponding to the given task to task attributes of the plurality of electronic messages stored in the message data store;

based on the determination that the additional electronic message is not a duplicate, placing the additional electronic message in a message queue; and retrieving the additional electronic message and execute the given task identified in the additional electronic message.

20. The computer storage media of claim 19, wherein the additional electronic message includes a task attribute that comprises at least one of:
　a source identifier attribute identifying a source of data on which the given task is to be performed,
　a target identifier attribute identifying a destination for data on which the given task is to be performed, or
　a data manipulation type attribute identifying type of data manipulation performed on the data as part of the given task, and the query input is based on the task attribute and a time interval corresponding to the given task.

* * * * *